(12) United States Patent
Burrows

(10) Patent No.: US 10,881,241 B2
(45) Date of Patent: *Jan. 5, 2021

(54) MOVING INLET NOZZLES IN BEVERAGE SYSTEMS

(71) Applicant: Coffee Solutions, LLC, Portland, OR (US)

(72) Inventor: Bruce D. Burrows, Valencia, CA (US)

(73) Assignee: Coffee Solutions, LLC, Portland, OR (US)

(*) Notice: Subject to any disclaimer, the term of this patent is extended or adjusted under 35 U.S.C. 154(b) by 239 days.

This patent is subject to a terminal disclaimer.

(21) Appl. No.: 16/024,453

(22) Filed: Jun. 29, 2018

(65) Prior Publication Data

US 2018/0303276 A1 Oct. 25, 2018

Related U.S. Application Data

(63) Continuation of application No. 14/810,429, filed on Jul. 27, 2015, now Pat. No. 10,045,654, which is a continuation-in-part of application No. PCT/US2015/015971, filed on Feb. 13, 2015, and a continuation-in-part of application No. PCT/US2015/025013, filed on Apr. 8, 2015.

(60) Provisional application No. 61/940,290, filed on Feb. 14, 2014, provisional application No. 62/060,282, filed on Oct. 6, 2014, provisional application No. 62/069,772, filed on Oct. 28, 2014, provisional application No. 62/136,258, filed on Mar. 20, 2015, provisional application No. 62/230,508, filed on Jun. 5, 2015, provisional application No. 62/174,443, filed on Jun. 11, 2015, provisional application No. 61/977,069, filed on Apr. 8, 2014.

(51) Int. Cl.
*A47J 31/36* (2006.01)
*A47J 31/46* (2006.01)

(52) U.S. Cl.
CPC ....... *A47J 31/3695* (2013.01); *A47J 31/3628* (2013.01); *A47J 31/46* (2013.01)

(58) Field of Classification Search
CPC ............... A47J 31/0631; A47J 31/0668; A47J 31/3628; A47J 31/3695; A47J 31/46; A47J 31/468
USPC .................................................. 99/287, 295
See application file for complete search history.

(56) References Cited

U.S. PATENT DOCUMENTS

| | | | | |
|---|---|---|---|---|
| 4,779,520 A * | 10/1988 | Hauslein | ................. | A47J 31/00 99/287 |
| 4,983,412 A * | 1/1991 | Hauslein | ................... | A23F 5/26 426/238 |
| 6,955,116 B2 * | 10/2005 | Hale | .................... | A47J 31/0673 99/289 R |
| 2013/0125759 A1* | 5/2013 | Lin | ......................... | A47J 31/44 99/281 |
| 2014/0144330 A1* | 5/2014 | Huang | .................... | A47J 31/46 99/300 |

(Continued)

*Primary Examiner* — Reginald Alexander
(74) *Attorney, Agent, or Firm* — Miller Nash Graham & Dunn LLP

(57) ABSTRACT

The brewing system disclosed herein includes a moving inlet nozzle for use in intermixing hot water and coffee in a coffee cartridge. The inlet nozzle may include one or more flow ports that inject hot water into an inner chamber of the coffee cartridge at select angles, locations and pressures to create the desired fluidized mixture of hot water and beverage medium.

22 Claims, 15 Drawing Sheets

(56) References Cited

U.S. PATENT DOCUMENTS

2015/0164267 A1* 6/2015 Hughes ................ A47J 31/465
426/595

* cited by examiner

FIG. 4A   FIG. 4B

MOVING INLET NOZZLES IN BEVERAGE SYSTEMS

CROSS-REFERENCE TO RELATED APPLICATIONS

The present application claims the benefit of PCT/US15/15971, filed 13 Feb. 2015 and entitled "Beverage Brewer and Related Methods for Brewing Beverages", which claims the benefit of U.S. Provisional Patent Application No. 61/940,290, filed 14 Feb. 2014 and entitled "Coffee Brewer and Related Methods for Brewing Beverages".

The present application also claims the benefit of U.S. Provisional Application Ser. No. 62/060,282, filed on 6 Oct. 2014 and entitled "Coffee Brewing System and Method of Using the Same"; U.S. Provisional Application Ser. No. 62/069,772, filed on 28 Oct. 2014 and entitled "Coffee Brewing System and Method of Using the Same"; U.S. Provisional Application Ser. No. 62/136,258, filed on 20 Mar. 2015 and entitled "Coffee Brewing System and Method of Using the Same"; and U.S. Provisional Application Ser. No. 62/230,508, filed on 5 Jun. 2015, entitled "Beverage Brewing Systems and Methods for Using the Same," and U.S. Provisional Application Ser. No. 62/174,443, filed on 11 Jun. 2015, entitled "Beverage Brewing Systems and Methods for Using the Same."

The present application also claims the benefit of PCT/US15/25013, filed Apr. 8, 2015, entitled"Beverage Brewing Systems and Methods for Using the Same".

The disclosures, figures, and subject matter of the above-identified patent applications are expressly incorporated by reference herein in their entirety.

BACKGROUND

Field

Aspects of the present disclosure generally relate to a liquid forming system and method of using the same. More specifically, the present disclosure relates to a coffee brewing system designed to brew a single-serve or multi-serve coffee cartridge or the like.

Background

Some types of beverage forming devices such as coffee brewers use a cartridge containing a slurry of beverage medium, e.g., ground coffee, to form a solution, e.g., beverage. In coffee brewers of this type, water (or other solvents), may be heated by the brewer and introduced into the cartridge at the brewer head. The water (solvent) infuses with the coffee grounds (slurry) in the cartridge, and extracts solutes (e.g., soluble portions of the slurry) or other materials from the coffee grounds to form the solution (e.g., beverage), which is then removed from the cartridge for consumption. Coffee brewers of this type use a stationary inlet needle that pierces the top of the cartridge and injects a relatively constant stream of hot water into the cartridge. This hot water stream may channel or tunnel through the ground coffee therein and not fully extract some grounds while over-extracting other grounds, resulting in a brewed beverage that can be bitter and can have an undesirable after taste. Coffee drinkers often try to mask this undesirable bitter taste with additives such as sugar or cream.

SUMMARY

The present disclosure describes beverage and/or brewing systems, and specifically systems for rotating, spinning or vertically oscillating an inlet nozzle within the interior of a beverage cartridge (e.g., a single-serve cartridge), wherein the moving inlet nozzle delivers a stream or spray of fluid, e.g., water, that wets and fluidizes at least a portion of the beverage medium therein to create a brewed beverage (e.g., a cup of coffee).

A single-serve beverage making device in accordance with an aspect of the present disclosure comprises a pump and a beverage head coupled to the pump. The beverage head comprises a receptacle, an inlet nozzle, and an outlet conduit. The receptacle is configured to selectively receive a sealed container within the receptacle of the beverage head when the beverage head is in a first position. The sealed container comprises an outer surface and an inner volume, and a beverage medium is contained within the inner volume of the sealed container.

The inlet nozzle is coupled to the pump and passes through the outer surface of the sealed container to couple at least a portion of the inlet nozzle to the inner volume of the sealed container when the beverage head is in a second position. The sealed container is substantially stationary with respect to the single serve beverage device while the beverage head is in the second position. While the beverage head is in the second position, the pump delivers at least a first fluid to an inner volume of the sealed container of beverage medium in the receptacle of the beverage head through the inlet nozzle such that an at least second fluid comprising the at least first fluid and a quantity of beverage medium are combined within the inner volume of the sealed container when the sealed container is present in the receptacle of the beverage head.

The outlet conduit is coupled to the inner volume of the sealed container of beverage medium and directs at least a portion of the second fluid out of the beverage head, such as to an external receptacle. For at least a portion of a time that the beverage head is in the second position, the inlet nozzle selectively moves with respect to the beverage medium while the inlet nozzle is passed through the outer surface of the sealed container and coupled to the inner volume of the sealed container, and when the at least first fluid is being delivered to the inner volume of the sealed container.

In one embodiment, the inlet nozzle itself may rotate or spin above or at least partially immersed within the coffee grounds. In another embodiment, the inlet nozzle may be stationary and include a central rotating shaft that spins or rotates one or more blades or fans at one end thereof to generate the fluidized mixture of hot water and coffee.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIGS. 4A-4C illustrate a beverage cartridge that may be employed with the beverage brewer in an aspect of the present disclosure;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Overview of Single-Serve Beverage System

Figure 1:
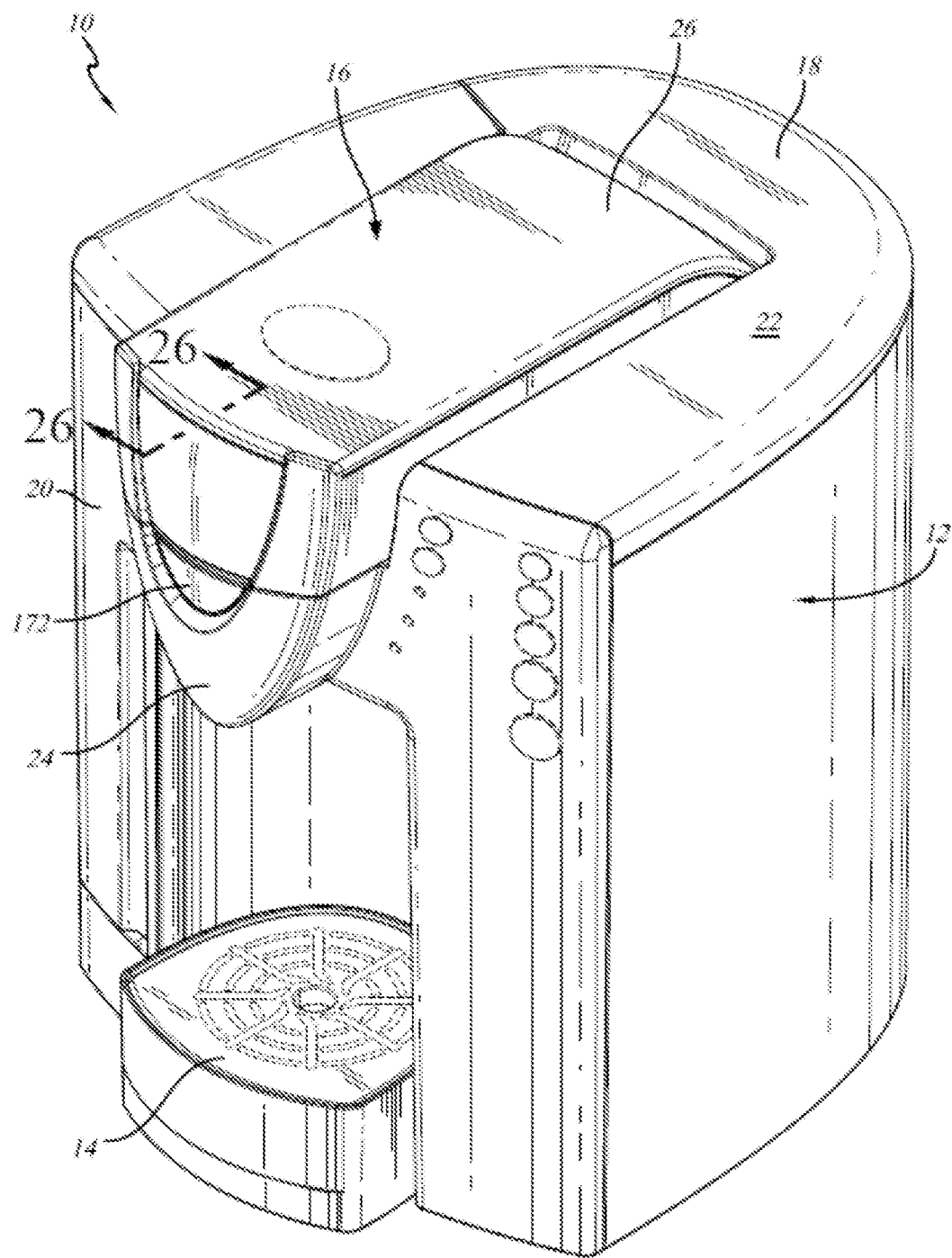
FIG. 1 illustrates a perspective view of one embodiment of a beverage brewer in accordance with an aspect of the present disclosure.

FIG. 1 illustrates a perspective view of one embodiment of a beverage brewer in accordance with an aspect of the present disclosure.

Figure 2:
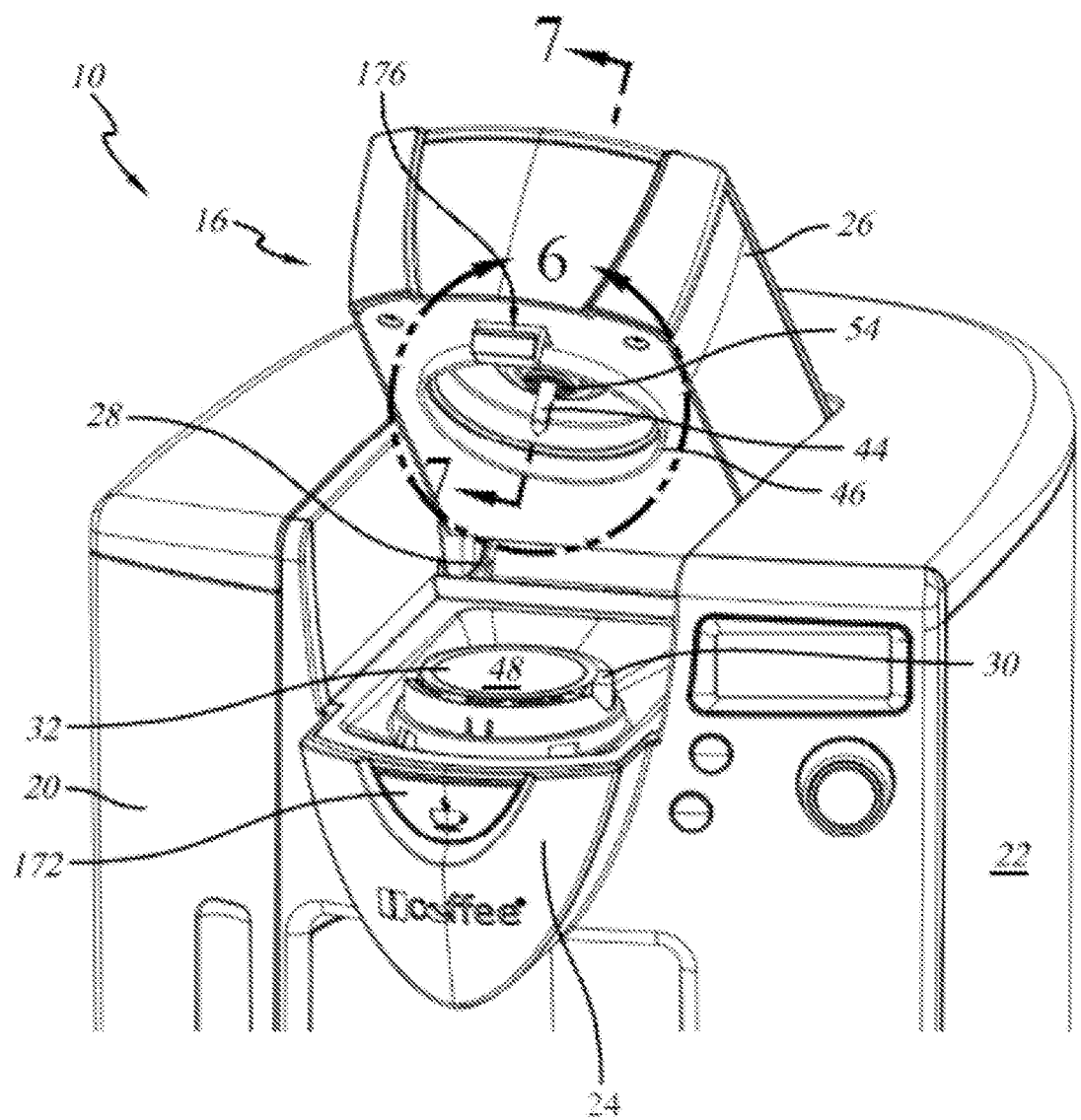
FIG. 2 is a perspective view of an embodiment of a beverage brewer, illustrating a lid of a brewer head in an open position in accordance with an aspect of the present disclosure.

A beverage brewer 10, as shown in FIGS. 1 and 2, may be designed for use with container-based beverage cartridges, such as single-serve coffee cartridges. The beverage brewer 10 may include a generally upright housing 12 having a base or platen 14 extending out at the bottom and positioned generally below an outwardly extending brewer head (also referred to as a "beverage head" herein) 16.

The vertical distance between the platen 14 and the brewer head 16 (also referred to as a "brew head 16" or a "beverage head 16" herein) can adequately accommodate a coffee mug or other external receptacle for delivery of the beverage from the beverage brewer 10. In some aspects of the present disclosure, the receptacle may be capable of retaining at least 6 oz. of beverage, and possibly 10 oz. or more of beverage. The housing 12 may further comprise a rear housing 18 having a gravity-fed and/or other type of water reservoir 20 on one side and an outer shell 22 that houses or protects the internal features of the beverage brewer 10, including, for example, the conduit system between the water reservoir 20 and the brewer head 16. Such features within the housing 12 of the beverage brewer 10 may generally include a fluid conduit system, a pump, and/or a heating element, in order to deliver a fluid from the reservoir 20 (or other source) to the brewer head 16 and/or to the receptacle external to the beverage brewer 10.

FIG. 2 is a perspective view of a beverage brewer, illustrating a lid of a brewer head in an open position (also referred to as a first position, second position, and/or access position herein) in accordance with an aspect of the present disclosure. As shown in FIG. 2, the brewer head 16 may be a clam-shell structure including a stationary lower support member 24 and a movable upper member or lid 26 that pivots relative to the lower support member 24 about a hinge 28. The scope of the present disclosure includes embodiments where the lower support member 24 and the lid 26 may both be movable, or that the lower support member 24 may be movable relative to a stationary lid 26. Additionally, the lower support member 24 and/or the lid 26 may pivot or rotate about the common hinge 28, or separate hinges or points within the beverage brewer 10.

The lower support member 24 and the lid 26 are selectively opened and closed and form a brew chamber therebetween during a brew cycle (also known as a preparation cycle) for selective retention of a beverage cartridge 32 in a receptacle 30 of the brewer head 16. The beverage cartridge 32 may include any liquid medium known in the art, including, but not limited to, liquid and/or beverage medium used to form various types of coffee, espresso, tea, hot chocolate, lemonade and other fruit-based drinks, carbonated drinks such as soda, soups and other liquid foods, etc.

In this respect, FIG. 1 illustrates the lid 26 engaged with the lower support member 24 such that the brewer head 16 is in the closed or locked position (also referred to as a brewing position, first position, and/or second position herein). A jaw lock 176 includes an externally accessible release button 172 which may be at or near the brewer head 16 and configured for hand manipulation. To open the brewer head 16, a user presses or otherwise activates the release button 172. Activation of the release button 172 selectively disengages the jaw lock 176 when the brewer head 16 is in the closed position shown in FIG. 1. Once the release button 172 is pressed, so long as the brewer head 16 is not in a preparation cycle or other operational mode that prevents opening of the brewer head 16, the lid 26 is able to pivot away from the lower support member 24 which allows access to the receptacle 30. In the position shown in FIG. 2, a user may selectively insert or remove a beverage cartridge 32.

To close the brewer head 16, the user may again activate the release button 172, and/or may push on the lid 26 to move the lid 26 closer to the lower support member 24. If the beverage brewer 10 senses a beverage cartridge 32 in the receptacle 30, or upon a user initiating closure of the lid 26 and/or a preparation cycle, the jaw lock 176 may selectively lock during a brew cycle and/or preparation cycle to prevent any liquid delivered by the beverage brewer 10 from being expelled by the beverage brewer 10 external to the receptacle located proximate to the platen 14. In this respect, the contact between the lower support member 24 and the jaw lock 176 selectively holds the brewer head 16 closed as shown in FIG. 1.

The beverage brewer 10 also comprises an inlet nozzle 44 that generally extends downwardly out from underneath the lid 26, as shown within the brewer head 16. The inlet nozzle 44 is coupled to, e.g., in fluid communication with, a conduit system, e.g., the pump 134, for injecting at least a first fluid, such as turbulent or laminar hot water and steam, a liquid such as water and/or milk, or other gas and/or other liquid in a fluid or semi-fluid form, into the beverage cartridge 32 through the inlet nozzle 44. Although described as the inlet nozzle 44 herein, the inlet nozzle 44 may be a needle, spine, spout, spigot, jet, projection, spike, and/or other inlet means for delivering the at least first fluid to a beverage medium 78.

Preparation Cycle for Making Beverages

Figure 3:
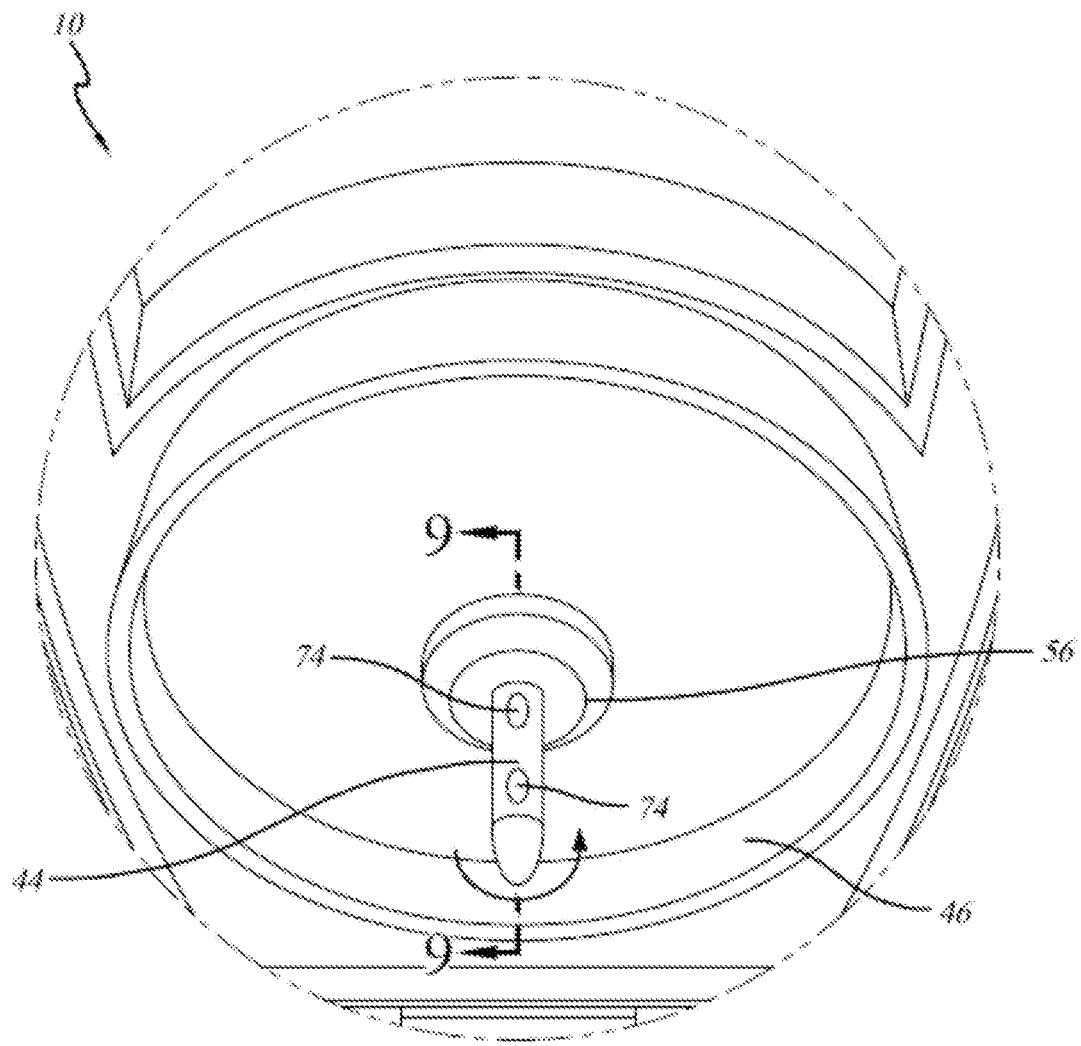
FIG. 3 is an enlarged front view of the brewer head taken about circle 6 in FIG. 2, further illustrating rotation or spinning motion of an inlet nozzle.

FIG. 3 is an enlarged front view of the brewer head taken about circle 6 in FIG. 2, further illustrating rotation or spinning motion of an inlet nozzle in an aspect of the present disclosure.

As mentioned above, to prepare the beverage brewer 10 for a brew cycle (also referred to a preparation cycle), the lid 26 is moved from a closed position (shown in FIG. 1) to an open position (shown in FIG. 2). When in an open or first position, the beverage cartridge 32 can be inserted into and/or removed from the receptacle 30. The receptacle 30 is configured to selectively receive and accept the beverage cartridge 32 within the receptacle 30 of the brewer head 16 when the brewer head 16 is in the open position shown in FIG. 2. The beverage cartridge 32 generally comprises a sealed container including an outer surface and an inner volume or chamber, although the beverage cartridge 32 can also include unsealed containers. A beverage medium 78, such as coffee, tea, soup, chocolate, etc., is contained within the inner volume of the beverage cartridge 32.

The lid 24 of the beverage brewer 10 may comprise an encapsulation cap 46 having a diameter sized for at least partial slide-fit insertion over the receptacle 30 to encapsulate and retain the beverage cartridge 32 therebetween. The beverage cartridge 32 may thus be held in a substantially stationary position with respect to the beverage brewer 10 device while the brewer head 16 is in the closed position, although it is understood that the beverage cartridge 32 can be held in a substantially stationary position via other means, and/or can be non-stationary.

Figure 4C:
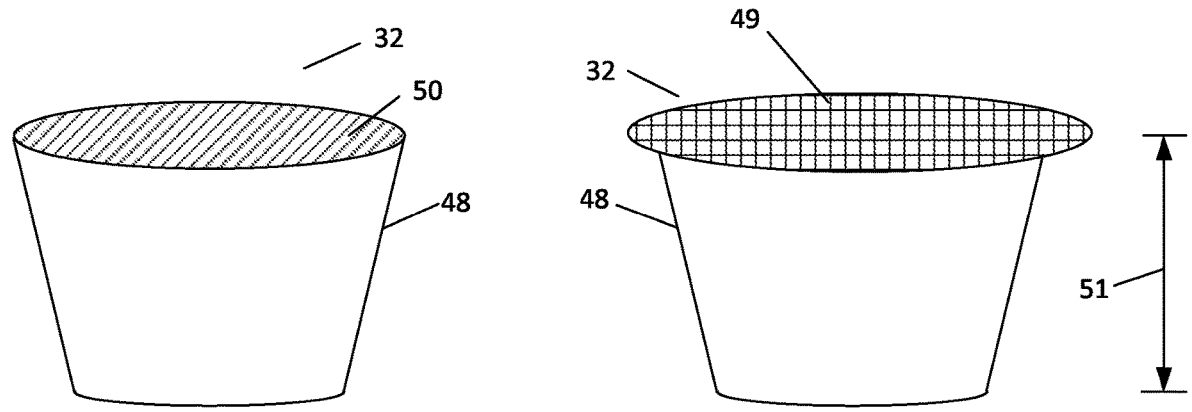
Figure 4C:
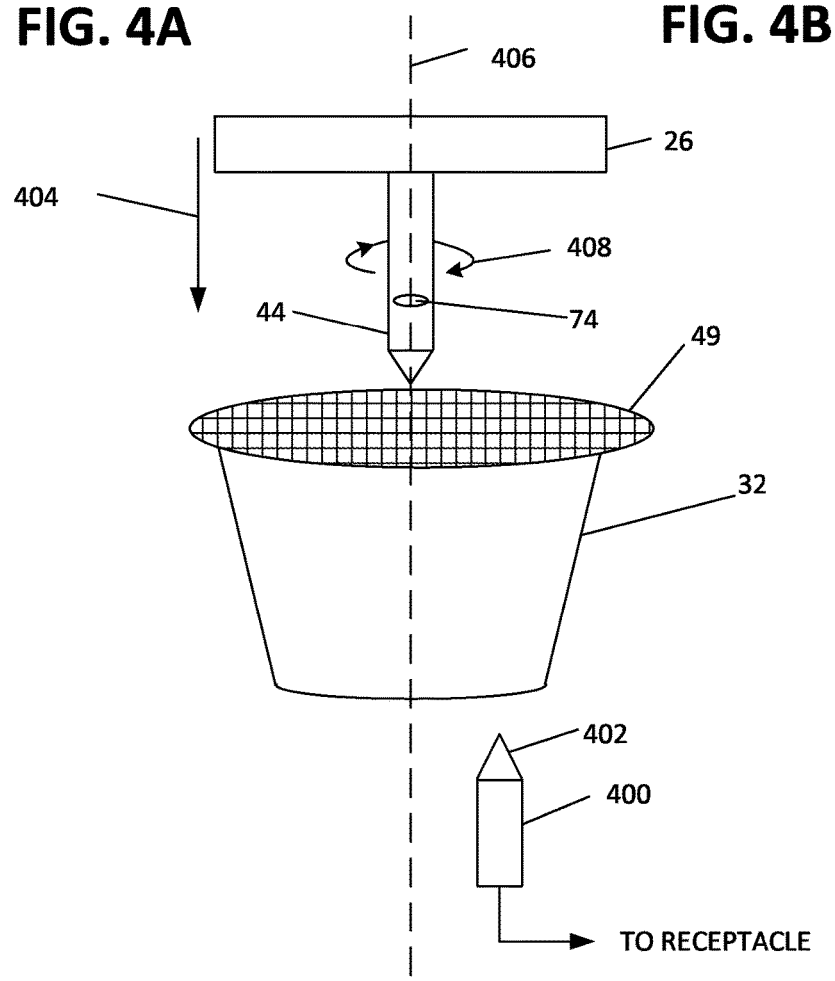

FIGS. 4A-4C illustrate a beverage cartridge that may be employed with the beverage brewer in an aspect of the present disclosure.

It is understood that a beverage cartridge, such as the beverage cartridge 32, is not required for operation of systems and methods according to the present disclosure. A beverage cartridge 32 may be employed within an aspect of the present disclosure. Further, other types of containers or uncontained mediums can also be used in embodiments of the present invention, such as soft pods, sealed or unsealed packets containing a liquid medium (e.g., coffee grounds), tea bags, grounds or leaves, etc. Beverage cartridge 32 may allow for easier brewing or making of beverages. Beverage cartridge 32 may comprise an outer surface 48 and an inner chamber 50. Beverage medium 78 may be contained or otherwise located within the inner chamber 50 (also referred to as an inner volume herein) of the beverage cartridge 32. Other features, such as a filter, etc., may also be included in the inner chamber 50 of the beverage cartridge 32, to filter coffee grounds, tea leaves, etc., that may be part of the beverage medium 78 not desired in a final beverage or liquid.

FIG. 4A illustrates an open or exposed inner chamber 50. As shown in FIG. 4B, beverage cartridge 32 may also comprise a cover 49. Cover 49 may comprise foil or other material to seal the beverage cartridge 32 from external environments that may be deleterious to the beverage medium 78 in the inner chamber 50. As such, beverage cartridge 32 may be sealed against air, water, or other external hazards until one or more entry points are made to access the inner chamber 50. Beverage cartridges 32, such as those that comprise a cover 49 and/or comprise one or more sealed inner chambers 50, may use a needle or other instrument, such as inlet nozzle 44, to direct a fluid into and/or out of the inner chamber(s) 50 of the beverage cartridge 32. Beverage cartridge 32 also comprises a height 51, also referred to as a vertical height herein. It is understood that while the beverage cartridge 32 is a sealed container, many different types of cartridges and/or mediums can be used.

FIG. 4C illustrates an aspect of the present disclosure where the beverage cartridge 32 is accessed by the inlet nozzle 44 and/or the outlet conduit 400. The outlet conduit 400 is coupled to the brewer head 16, and is selectively coupled to the beverage cartridge 32 when the brewer head 16 is in a certain position. The outlet conduit 400 can comprise a point 402 that, when the lid 26 is pushed downward toward the lower support member 24 or the lid 26 is otherwise closed as shown by arrow 404, the beverage cartridge 32 is pressed onto the point 402, and the outlet conduit 400 now has access to the inner chamber 50 of the beverage cartridge 32. Alternatively, the beverage cartridge 32 may be pressed onto the point 402 upon user placement of the beverage cartridge 32 into the brewer head receptacle 30. Many different embodiments are possible as would be understood by one of skill in the art, and it is also contemplated that an outlet conduit according to the present invention can access a medium, such as a medium within a beverage cartridge, with or without a point 402.

The lid 26 can be pushed downward toward the lower support member 24 such that the inlet nozzle 44 is placed proximate the beverage medium 78, and in some embodiments, at least below a level of the height 51 of the beverage cartridge 32. In one such system and method according to the disclosure, the lid 26 is pushed downward toward the lower support member 24 and/or is closed, e.g., such that the lid 26 is locked and/or otherwise sealed against the lower support member 24 as shown in FIG. 1. In embodiments where the beverage medium 78 is contained in a soft pod, bag, filter, or other device where beverage cartridge 32 is not used, the inlet nozzle 44 may be placed proximate to the beverage medium 78 to direct the fluid from the flow port 74 toward the beverage medium 78. In embodiments where the beverage cartridge 32 comprises a cover 49, the inlet nozzle 44 may pierce the beverage cartridge 32, either through the cover 49 or through another portion of the outer surface 48, which provides the flow port 74 with access to the inner chamber 50 of the beverage cartridge 32. Where the beverage cartridge 32 is open, e.g., does not comprise cover 49 or the beverage medium is otherwise accessible to the inlet nozzle 44 without breaking or puncturing beverage cartridge 32, the inlet nozzle 44 may be placed proximate to the beverage medium 78 in the beverage cartridge 32. The proximate placement of inlet nozzle 44 to the beverage medium 78 includes the inlet nozzle 44 being partially or fully immersed in the beverage medium 78 as well as being maintained at a level above and/or near a top of the beverage medium 78, whether or not the beverage medium 78 is contained in a beverage cartridge 32. In an aspect of the present disclosure, the inlet nozzle 44 pierces the beverage cartridge 32 approximately on a center line 406 of the beverage cartridge 32, e.g., through the cover 49, although it is understood that, in other embodiments, an inlet nozzle 44 may puncture the beverage cartridge 32 in off-center locations or other locations of the outer surface 48 of the beverage cartridge 32. At a desired time, the inlet nozzle 44 may be rotated as shown by arrow 408 while coupled to the inner chamber 50. In such situations, the beverage cartridge may be substantially stationary with respect to the beverage brewer 10, as motion of both the inlet nozzle 44 and the beverage cartridge 32 may result in fluid from the beverage cartridge 32 being directed somewhere other than the outlet conduit 400. However, in other embodiments, it may be desirable to move both the inlet nozzle 44 and the beverage cartridge 32, e.g., simultaneously. For many applications, delivery of fluid from the beverage cartridge somewhere other than outlet conduit 400 is undesired.

Operation of the Beverage Brewer

Figure 5:
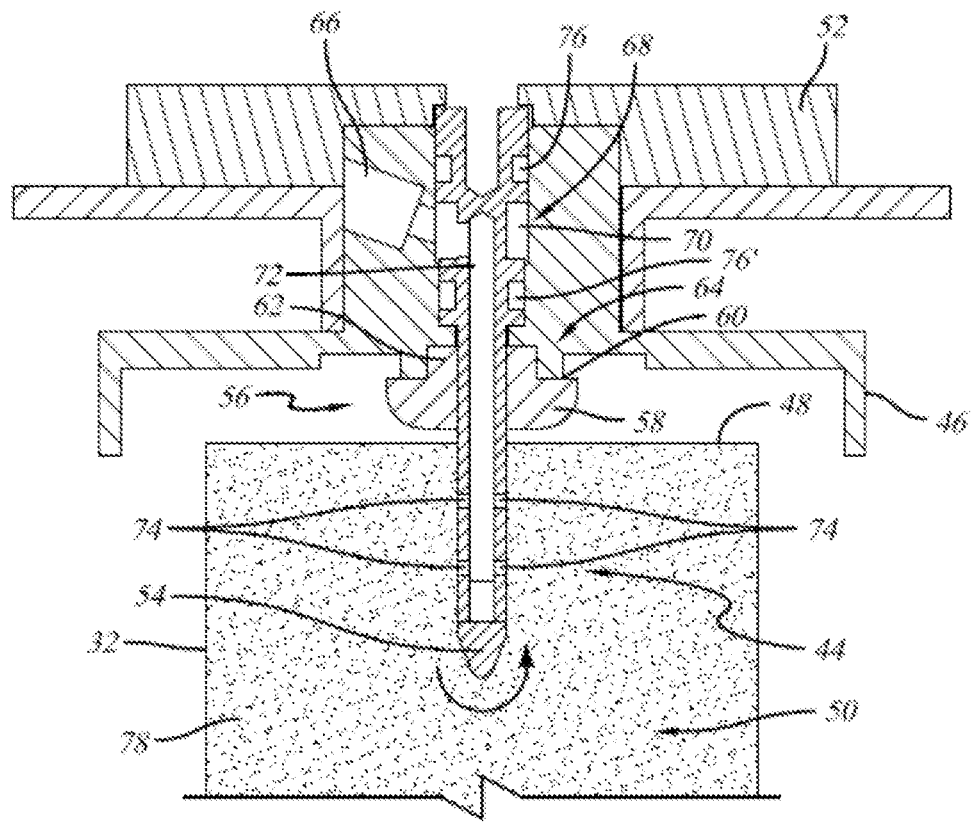
FIG. 5 is a cross-sectional view of the brewer head taken about the line 7-7 in FIG. 2, in accordance with an aspect of the present disclosure.

FIG. 5 is a cross-sectional view of the brewer head taken about the line 7-7 in FIG. 2 in an aspect of the present disclosure.

FIG. 5 illustrates at least some of the internal fluid, e.g., water, steam, etc., flow paths in the beverage brewer 10 that pass through the brewer head 16, the inlet nozzle 44, and a plurality of flow ports 74, and into the inner chamber 50 of a container-based beverage cartridge 32. As described with respect to FIG. 4C, When the lid 26 is pivoted to the closed position shown in FIG. 1, the inlet nozzle 44 is correspondingly moved into a position to puncture or otherwise pass through an outer surface 48 of the beverage cartridge 32 and extend down into an inner beverage medium-filled chamber 50 of the beverage cartridge 32.

When the brewer head 16 is in the closed position, the inlet nozzle 44 may be rotated by a motor 52 or other means coupled to the inlet nozzle 44 for at least a portion of the time while fluid is being delivered to the inner volume of the sealed container or for at least a portion of the time that the beverage brewer 10 is in the closed position. The same or different motor or means may also selectively vertically move or position the inlet nozzle 44 with respect to the beverage cartridge 32 and/or the beverage medium 78.

The inlet nozzle 44 in accordance with an aspect of the present disclosure may comprise a blunt or rounded nose 54 that force pierces the surface 48 to permit entry of the inlet nozzle 44 into the interior of the beverage cartridge 32. The nose of the inlet nozzle 44 may be sharpened, e.g., with jagged edges, having a point on the inlet nozzle 44, etc., to make the piercing of the outer surface 48 easier, but such a sharp or jagged edge may be less desirable since such an embodiment carries an inherently higher risk of user injury when the inlet nozzle 44 is exposed to the user as shown in FIG. 2.

The brewer head 16 may further include a gasket 56 having a concentric aperture with an inner diameter sized to snugly slide-fit around the exterior surface diameter of the inlet nozzle 44. The gasket 56 may be made from any sealing material, e.g., rubber, silicone, other food-safe materials, etc. In an aspect of the present disclosure, FIG. 5 shows the gasket 56 with a generally larger mushroom-shaped head 58 forming a ledge or step 60 that has a relatively smaller diameter neck 62 including an outer diameter sized for snug slide-fit reception into a corresponding aperture 64 in the brewer head 16 permitting extension of the inlet nozzle 44 into the beverage cartridge 32. In this respect, the gasket 56 pressure seals the inlet nozzle 44 relative to the interior of the brewer head 16 and related hot water conduit system. Other shaped gaskets are possible within the scope of the present disclosure.

A fluid conduit 66 (also referred to as a hot water conduit 66 herein) terminates at an upper end 68 of the inlet nozzle 44 and is generally aligned with an inlet channel 70 bored into the exterior diameter of the inlet nozzle 44. The inlet channel is coupled to, e.g., in fluid communication with, a central shaft 72 that channels fluid water from the upper end 68 toward the nose 54 and out through one or more flow ports 74. O-rings 76, 76' may be positioned on each side of the inlet channel 70 to assist in minimizing leakage from pressurized fluid leaving the fluid conduit 66 for flow into the inlet channel 70.

The inlet channel 70 may be a reduced diameter bore that remains coupled with the fluid conduit 66 during the preparation cycle, and may remain coupled to the fluid conduit 66 while the inlet nozzle 44 spins or rotates within the beverage cartridge 32. As such, any fluid delivered to the beverage cartridge 32 through the inlet nozzle 44 while the inlet nozzle 44 is spinning or rotating may cause the beverage medium 78 to move as described herein. Accordingly, in this arrangement, a motor 52 couples to the upper end 68 and rotates or spins the inlet nozzle 44 during a brew cycle to rotate or spin the one or more flow ports 74 within the beverage cartridge 32 to more thoroughly mix the fluid delivered through inlet nozzle 44 with the beverage medium 78. A secondary fluid, comprising a mixture of the fluid delivered through the inlet nozzle 44 and a portion of the beverage medium 78, is thus created during the preparation cycle. The secondary fluid may be, for example, coffee, tea, etc., where the secondary fluid does not include, or includes only limited, solids from the beverage medium 78 ( e.g., coffee grounds, tea leaves, etc.). In other words, some of the beverage medium 78 may remain in the beverage cartridge 32 after mixture with the fluid delivered through the inlet nozzle 44, whether or not the inlet nozzle 44 is rotated or otherwise moved while coupled to the inner chamber of the beverage cartridge 32. This secondary fluid may be referred to as a "fluidized mixture" herein.

The embodiment of the present disclosure shown in FIG. 5 illustrates four flow ports 74, but the inlet nozzle 44 may have as few as one flow port 74 or more than four flow ports 74 without departing from the scope of the present disclosure. The ports 74 may be structured or otherwise designed to inject fluid (e.g., hot water) into the beverage cartridge 32 in a variety of different ways, including an upward stream or spray and/or a downward stream or spray. Rotational movement of the inlet nozzle 44 and the injection stream or spray of hot water from the nozzle 44 may create a fluidized mixture of hot water and coffee within the interior of the beverage cartridge 32. As such, an aspect of the beverage brewer of the present disclosure described herein helps minimize channeling and/or overexposure of beverage medium (e.g., coffee grounds) during the preparation cycle. At least with respect to coffee, this may substantially reduce unwanted flavors and/or tastes, such as the bitter taste often associated with single-serve coffee brewers. Further, rotation of the inlet nozzle 44 within the beverage medium 78 in an aspect of the present disclosure may also produce a noticeable layer of coffee crema after the brewed coffee dispenses from the brewer head 16 into the receptacle (e.g., mug, cup, etc.) proximate the platen 14.

Nozzle Rotation

Figure 6:
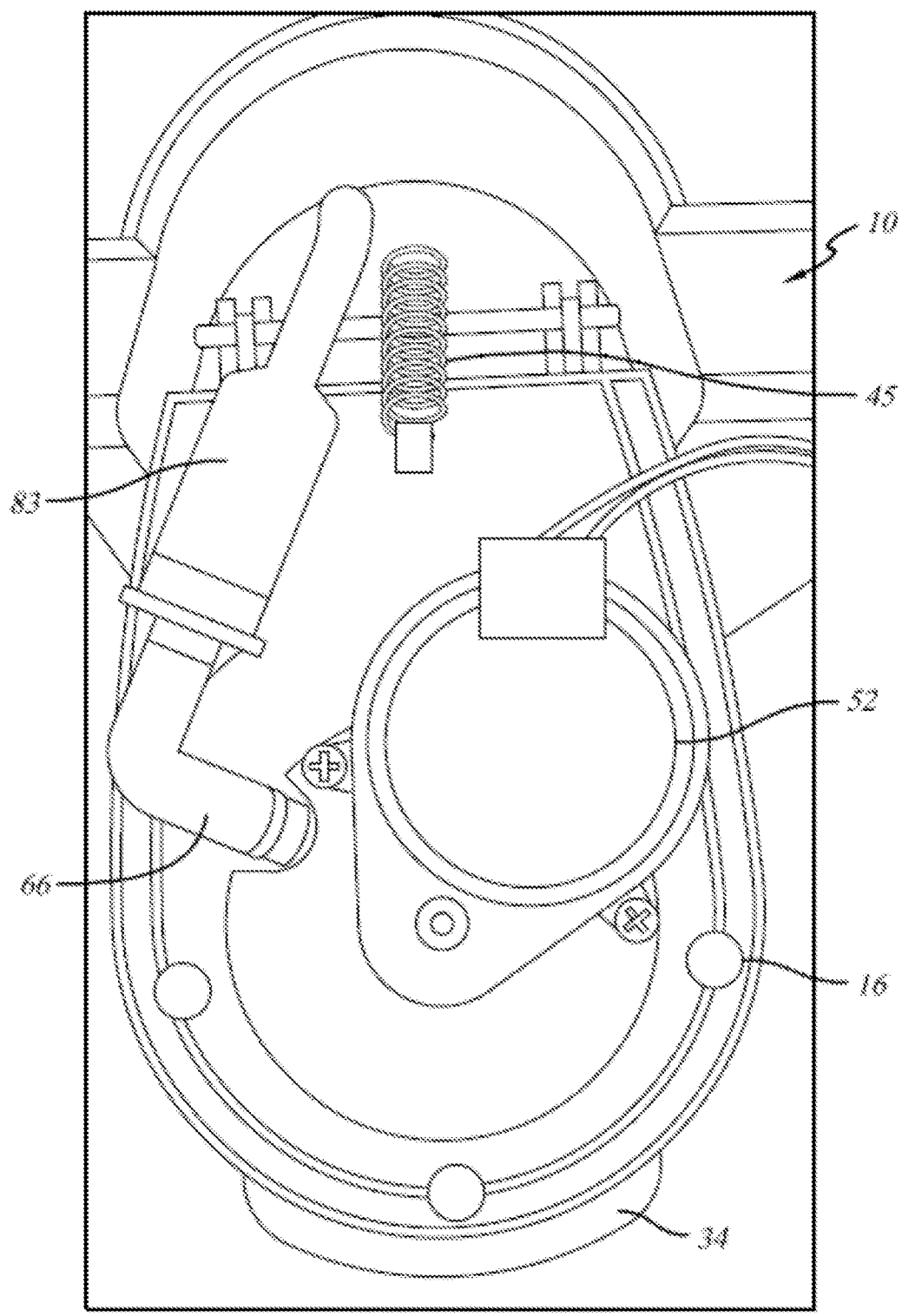
FIG. 6 is a top view of the brewer head, illustrating a motor for rotating the inlet nozzle in accordance with an aspect of the present disclosure.

FIG. 6 is a top view of the brewer head, illustrating a motor for rotating the inlet nozzle in accordance with an aspect of the present disclosure.

From the perspective of FIG. 6, the top view of the brewer head 16 illustrates a top mounted motor 52 that may be used to rotate the inlet nozzle 44 (which is located opposite the view shown in FIG. 6) 360 degrees at a constant speed (typically measured in revolutions per minute, or RPMs) or at variable speeds (e.g., higher RPMs when the brew cycle first initiates and relatively slower RPMs closer to the end of the brew cycle, or vice versa). Alternatively, the motor 52 may only partially rotate or pivot the inlet nozzle 44 (e.g., 300 degrees), then stop and reverse rotation (e.g., an opposite 300 degrees). This same or similar partial rotational feature may also be accomplished through use of a solenoid (not shown), as opposed to the motor 52.

The motor 52 is shown next to the entry point of the hot water conduit 66. In this embodiment, hot water flow to the brewer head 16 may be regulated by a solenoid 83. FIG. 6 also illustrates the extension spring 45 coupled within the interior of the lid 26, which urges the lid 26 to pivot from the closed position shown in FIG. 1 to the open position shown in FIG. 2 when the jaw clip 36 is released.

For example, and not by way of limitation, the inlet nozzle 44 may rotate at variable speeds within a brew cycle, or may rotate at a constant speed for part of a brew cycle and for another portion of the brew cycle the inlet nozzle 44 may rotate at variable speeds or in a different direction. As discussed herein, the present disclosure also envisions that the inlet nozzle 44 may do more than rotate about its own central axis; the inlet nozzle 44 may oscillate, nutate, rotate about a non-central axis such as an axis remote from the inlet nozzle 44 itself, or otherwise move within the brewer head 16 (including combinations of the movements mentioned above), whether or not the inlet nozzle 44 is inserted into the beverage cartridge 32, at least in part to agitate, move, or otherwise assist in the infusion of the fluids from the inlet nozzle 44 with the beverage medium 78. The inlet nozzle 44 may be moved, rotated, nutated, oscillated, vibrated, or subjected to any combination of various motions based on the brew cycle duration, type of beverage cartridge 32, water temperature, or other factors as desired to create a desired mixture of the beverage medium 78 with one or more fluids delivered through the inlet nozzle 44.

Further, a "rotation" may only be a partial rotation, rotation or motion in a different direction, or movement about one or more different axes of the inlet nozzle 44 or about an axis of another device (e.g., the motor 52) of the beverage system 10. The present disclosure also envisions various methods for moving the inlet nozzle 44. As described with respect to FIG. 8, the inlet nozzle 44 may be attached to a motor 52, and thus the inlet nozzle 44 is rotated as the motor 52 is energized. However, the inlet nozzle 44 may be stationary and attached to another device that is part of the beverage system that moves. In this particular embodiment, the inlet nozzle 44 may move with respect to the beverage medium 78, the inner chamber 50, and/or the beverage cartridge 32. In one such embodiment, the beverage cartridge 32 is substantially stationary relative to the beverage brewer 10.

Inlet Nozzle Configurations

Figure 7:
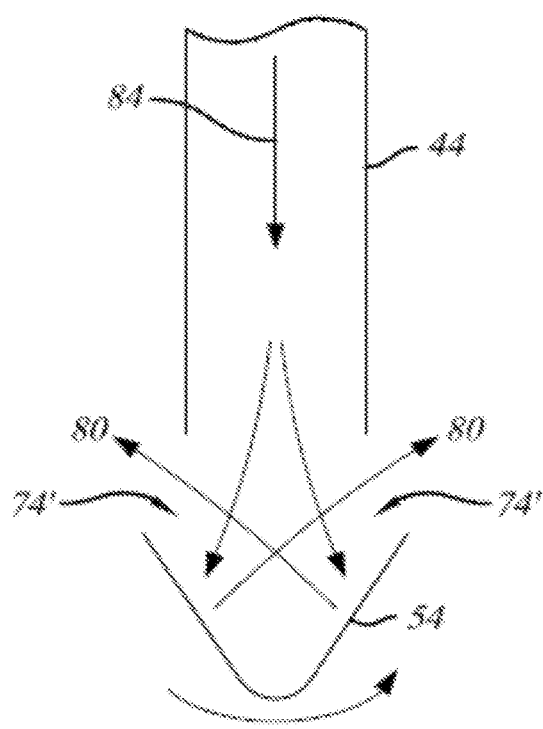
FIG. 7 is a cross-sectional view of an inlet nozzle in accordance with an aspect of the present disclosure.

FIG. 7 is a cross-sectional view of an inlet nozzle in an aspect of the present disclosure.

FIG. 7 illustrates a pressurized fluid flow 84, e.g., hot water, steam, or other fluids as provided by a pump or other pressure source internal or external to beverage brewer 10, flowing through the interior of the inlet nozzle 44 toward the nose 54. In this embodiment, the pressurized hot water flow 84 contacts an angled or concave interior portion of the nose 54 as shown and is ejected out therefrom as the stream or spray 80 through one or more of the flow ports 74'. In this respect, a person of ordinary skill in the art will readily recognize that the interior of the nose 54 can be shaped as desired to obtain the desired direction and intensity of directional outflow or spray 80. The inlet nozzle 44 may rotate about its axis, or otherwise move, such that the stream or spray 80 fluidizes and rotates the beverage medium 78 (e.g., ground coffee) in the beverage cartridge 32.

Figure 8:
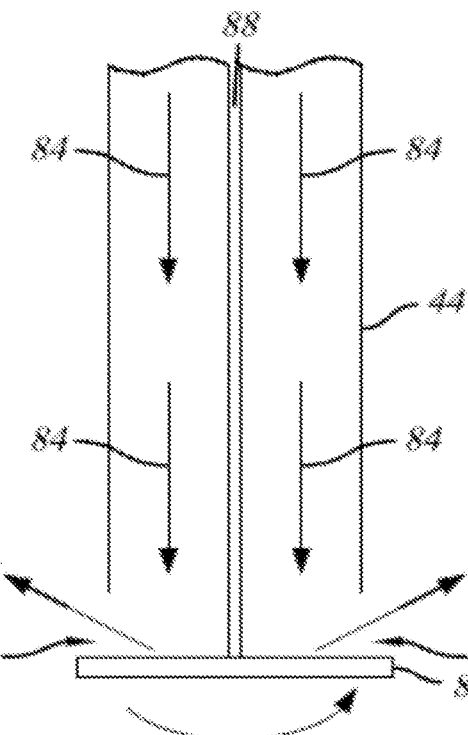
FIG. 8 is a cross-sectional view of an inlet nozzle in accordance with an aspect of the present disclosure.

FIG. 8 is another cross-sectional view of an inlet nozzle in accordance with another aspect of the present disclosure.

FIG. 8 illustrates an embodiment wherein the shaft of the inlet nozzle 44 is stationary and includes a spinning or rotating platform 86 designed to disperse the incoming flow 84 into the aforementioned stream or spray 80. In this embodiment, the platform 86 may include a shaft 88 coupled to the motor 52 and driven at a constant or variable rate (RPM) to attain substantial rotational fluidized mixture of the hot water and beverage medium 78 in the beverage cartridge 32. The platform may be coupled to the nose 54 if desired. The platform 86 may also have serrations or other surface features to disperse the incoming flow 84 as desired.

Figure 9:
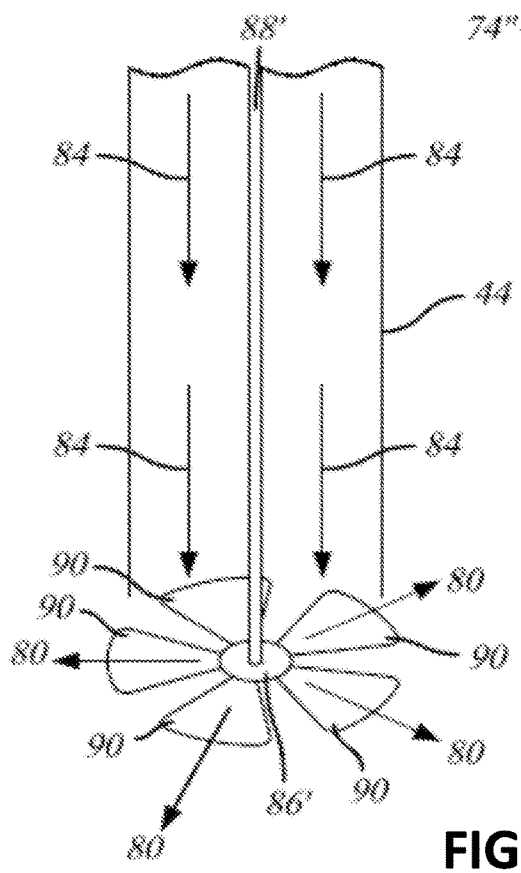
FIG. 9 is across-sectional view of an inlet nozzle in accordance with an aspect of the present disclosure.

FIG. 9 is another cross-sectional view of an inlet nozzle in accordance with an aspect of the present disclosure.

As shown in FIG. 9, a modified platform 86' may include one or more straight or angled fans or blades 90 attached or otherwise extending therefrom and configured to be hydraulically driven by the pressurized fluid flow 84 travelling through the interior of the inlet nozzle 44. In this embodiment, the fluid flow 84 contacts the blades 90 and causes the modified platform 86' to spin or rotate about its shaft 88' in a comparable manner as if driven by the motor 52 in response to the fluid flow 84 contacting the blades 90. This embodiment may be employed as a mechanism for saving energy and/or cost related to the installation, use and power requirements of the motor 52.

Figure 10:
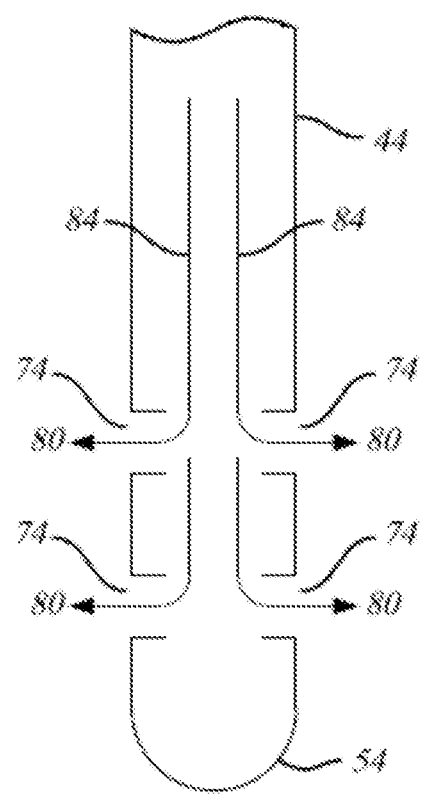
FIG. 10 is a cross-sectional view of an inlet nozzle in accordance with an aspect of the present disclosure.

FIG. 10 is a cross-sectional view of an inlet nozzle in accordance with another aspect of the present disclosure.

FIG. 10 illustrates an aspect of the present disclosure wherein four flow ports 74 are positioned generally horizontal and perpendicular to the vertical length of the inlet nozzle 44 and generally opposite one another. The embodiment of the present disclosure illustrated in FIG. 10 provides for a stream or spray 80 exiting the inlet nozzle 44 that is generally tangential to the inlet nozzle 44. More than or less than four flow ports 74 can be used.

Figure 11:
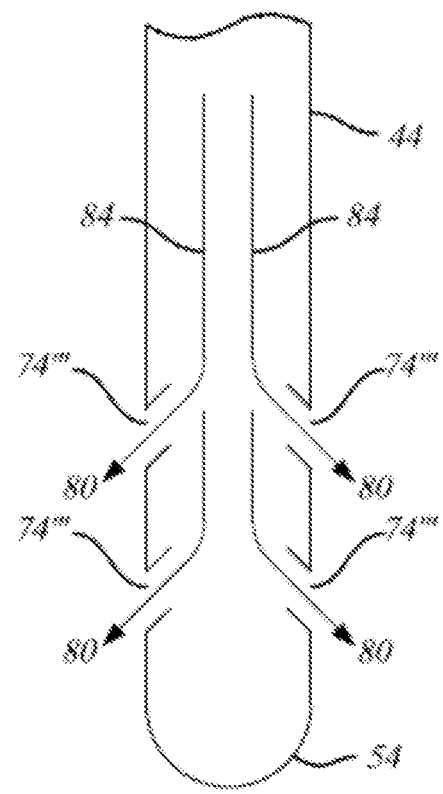
FIG. 11 is a cross-sectional view of an inlet nozzle in accordance with an aspect of the present disclosure.

FIG. 11 is another cross-sectional view of an inlet nozzle in accordance with an aspect of the present disclosure.

FIG. 11 illustrates an alternative embodiment wherein four flow ports 74''' channel the fluid flow 84 out from the inlet nozzle 44 at an acute angle. The discharge angle from the inlet nozzle may vary between the generally tangential flow (e.g., 90 degree turn) shown in FIG. 9 and near parallel flow (e.g., on the order of 5 or 10 degrees) as shown in FIG. 11 (not to scale). The discharge angle of the flow ports could, of course, be the reverse of the acute angles shown in FIG. 11, or at any desired angle with respect to the inlet nozzle 44. As shown in FIG. 11, the inlet nozzle 44 produces a downwardly projecting stream or spray of incoming fluid flow 84 into the beverage cartridge 32. Rotation or other movement of the inlet nozzle 44 then changes location that the discharge from the inlet nozzle 44 contacts the inner chamber 50 of the beverage cartridge 32, which may aid in the fluidization of the beverage medium 78 in the inner chamber.

Figure 12:
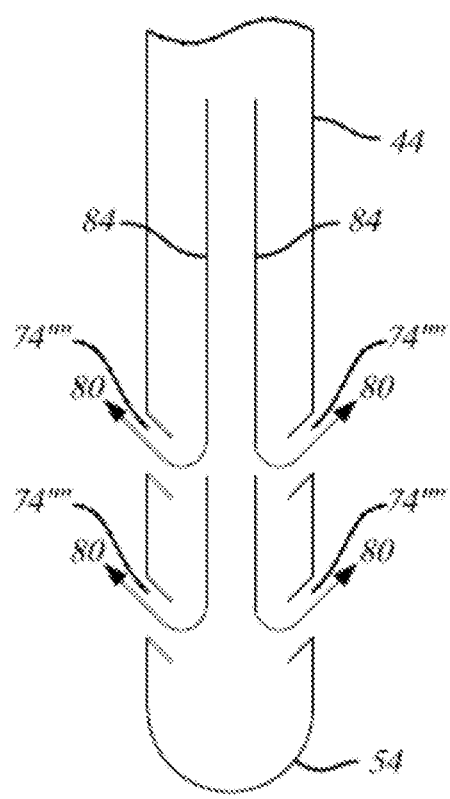
FIG. 12 is a cross-sectional view of an inlet nozzle in accordance with an aspect of the present disclosure.
Figure 13:
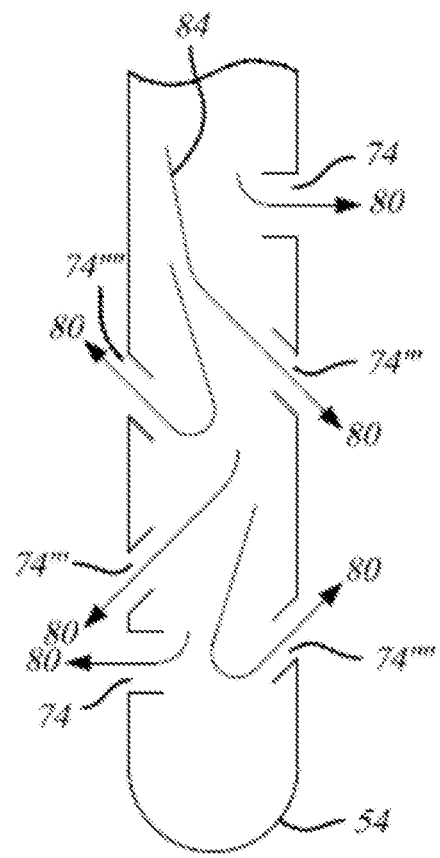
FIG. 13 is a cross-sectional view of an inlet nozzle in accordance with an aspect of the present disclosure.

FIGS. 12 and 13 are cross-sectional views of inlet nozzles in accordance with various aspects of the present disclosure.

FIG. 12 illustrates one embodiment of the present disclosure wherein a plurality of flow ports 74"" are oriented to direct the stream or spray 80 in an upward manner at angles larger than 90 degrees relative to the incoming flow 84, and upwards of 170 or 175 degrees relative to the incoming fluid flow 84. Other angles of stream or spray 80 are possible within the scope of the present disclosure.

As shown in FIG. 13, the inlet nozzle 44 could include a mixture of the flow ports 74-74"". FIG. 13 illustrates an inlet nozzle 44 comprising horizontal flow ports 74 that produce tangential outward flow of the stream or spray 80, the downwardly facing or acute flow ports 74''' that direct the stream or spray 80 in a downward or acute manner relative to the incoming fluid flow 84, and upwardly facing or obtuse flow ports 74"" that direct the stream or spray 80 in an upward or obtuse manner relative to the incoming fluid flow 84. Of course, each of the flow ports 74-74"" can be mixed and matched as desired along the length of the inlet nozzle 44 or the nose 54 to attain the desired outward flow of fluid to adequately mix and fluidize the beverage medium 78 within the beverage cartridge 32 during the preparation cycle. The pressure delivered to the flow ports 74-74"" can also be constant or variable during the course of the preparation cycle.

The beverage brewer 10 may initiate incoming fluid flow 84 through the inlet nozzle 44 prior to rotation or movement of the inlet nozzle 44 to prevent clogging any of the flow ports 74-74"" at the start of the preparation cycle. In some embodiments, the flow ports 74-74"" may be of a shape and size such that they may collect beverage medium 78 as the inlet nozzle 44 spins, similar to a scoop or receptacle. The collected beverage medium 78 may occlude the flow ports 74-74"", thereby substantially occluding or otherwise preventing fluid from adequately exiting the inlet nozzle 44. Initiating fluid flow 84 may allow the pressurized fluid 84 to establish an exit stream that otherwise prevents beverage medium 78 from entering the flow ports 74-74"", to substantially reduce or eliminate the potential for the beverage medium 78 to block any one of the flow ports 74-74"". Similarly, the beverage brewer 10 may stop rotation of the inlet nozzle 44 before stopping the flow of fluid flow 84 water through any of the flow ports 74-74"" to flush any beverage medium 78 away from the flow ports 74-74"" at the end of the preparation cycle. In some embodiments, the delay after fluid flow exiting the inlet nozzle 44 and the before the beginning of inlet nozzle 44 movement can be a non-zero time of less than two seconds. In another embodiment this time is 0.1 to 1.0 second, and in another embodiment this time is 0.5 second. Similarly, in some embodiments, the delay between cessation of inlet nozzle 44 movement and the cessation of fluid flow can be a non-zero time of less than two seconds; 0.1 to 1.0 second; and/or 0.5 second. Under certain circumstances, this goal can be achieved by beginning fluid flow and inlet nozzle 44 movement simultaneously. Additionally, it may be advantageous to initiate fluid flow when the flow ports 74-74"" are at a position above the beverage medium 78 (e.g., before the flow ports 74-74"" are in contact with the beverage medium 78), and then move the inlet nozzle 44 into contact with the beverage medium 78 and/or move the inlet nozzle 44 to a position proximate to the beverage medium 78 after flow has begun.

Figure 14:
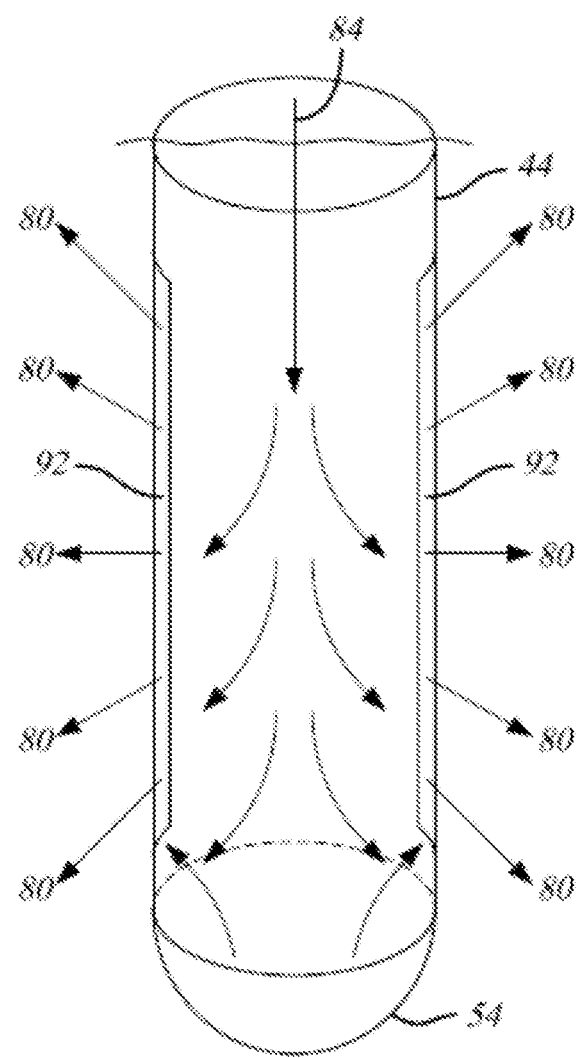
FIG. 14 is a cross-sectional view of an inlet nozzle in accordance with an aspect of the present disclosure.

FIG. 14 is an alternative cross-sectional view of the inlet nozzle in accordance with an aspect of the present disclosure.

FIG. 14 illustrates an embodiment wherein the flow ports are elongated and form one or more exit channels 92. The exit channels 92 may be particularly configured to attain a wider or open flow of the stream or spray 80 as shown in FIG. 14. The elongated channel 92 may track the vertical height 51 (shown in FIG. 4B) of the beverage cartridge 32 by as little as 50% of the vertical height 51 and by as much as 95% of the vertical height 51, although embodiments of less than 50% and above 95% are contemplated. The elongated channels 92 may be centered within the inner chamber 50, but the channels 92 may also be at a staggered height relative to the beverage cartridge 32 sidewalls, or staggered relative to each other if more than one channel 92 is configured in the inlet nozzle 44. In an embodiment as shown in FIG. 14, the elongated channel 92 may be able to better disperse fluid flow 84, e.g., laminar or turbulent hot water, into the inner chamber 50 such as, e.g., when the inlet nozzle 44 rotates, spins, or otherwise moves within the beverage cartridge 32.

Figure 15:
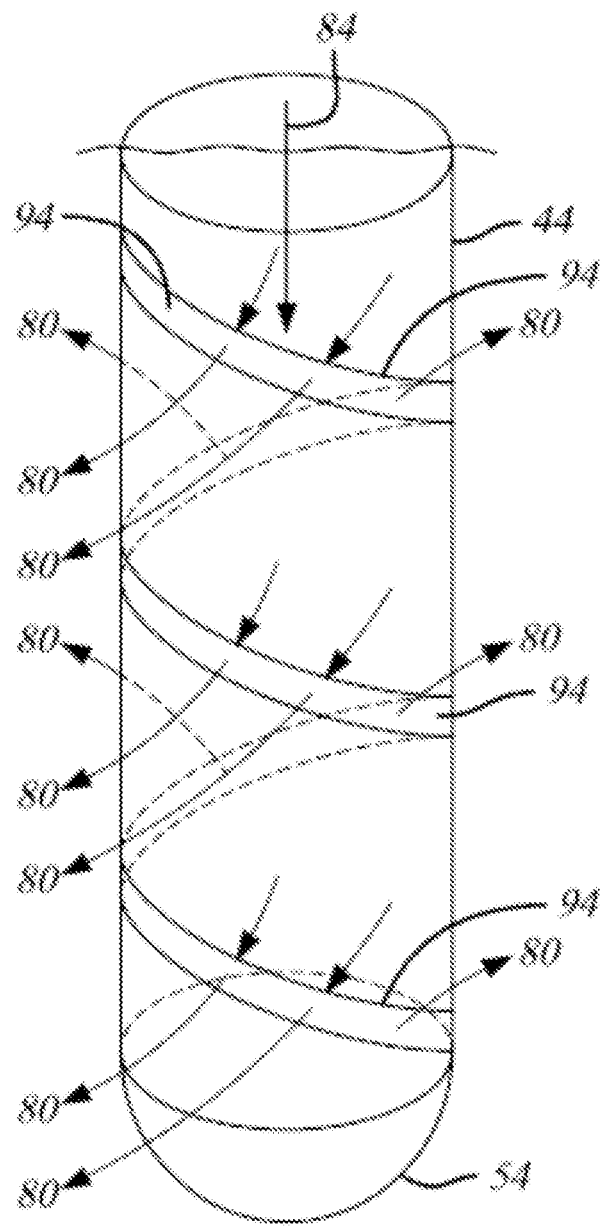
FIG. 15 is a cross-sectional view of an inlet nozzle in accordance with an aspect of the present disclosure.

FIG. 15 is another cross-sectional view of the inlet nozzle in accordance with an aspect of the present disclosure.

As shown in FIG. 15, the flow port of the inlet nozzle 44 may be in the form of a downwardly extending spiral channel 94 that generally tracks the outer periphery of the inlet nozzle 44. The number and orientation of the flow ports 74-74"", the elongated channels 92 and the spiral channel 94 may be mixed and matched as desired in a given beverage brewer 10 to obtain the desired stream or spray 80 exiting the inlet nozzle 44. For example, and not by way of limitation, the flow ports 74-74"" or the channels 92, 94 could be staggered, positioned opposite one another, or positioned at various angles (e.g., every 30, 60 or 90 degrees) along a given inlet nozzle 44.

Figure 16:
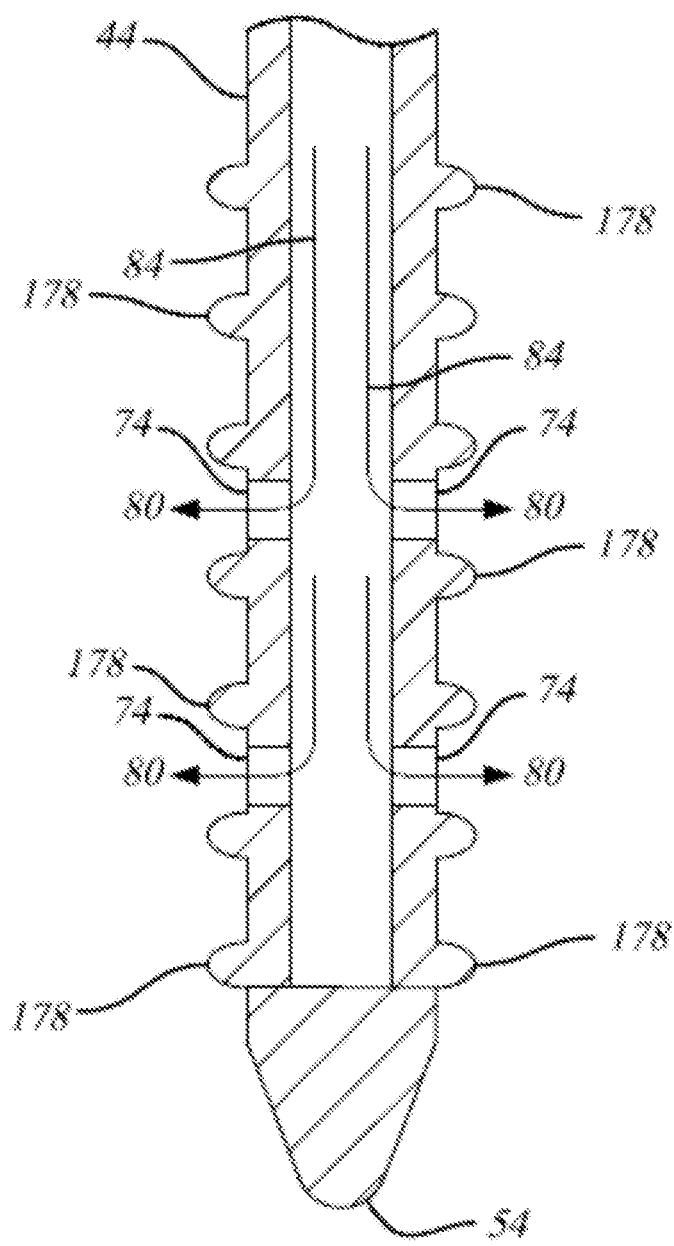
FIG. 16 is a cross-sectional view of an inlet nozzle in accordance with an aspect of the present disclosure.

FIG. 16 is a cross-sectional view illustrating an inlet nozzle in accordance with an aspect of the present disclosure.

FIG. 16 illustrates an embodiment of the inlet nozzle 44, including at least one, and in the embodiment illustrated in FIG. 16, a plurality of serrations 178 disposed or otherwise formed along the outer periphery of the inlet nozzle 44 for agitating the beverage medium 78 in the cartridge 32. The serrations 178 preferably act as paddles that stir or otherwise move the beverage medium 78 and heated water in the beverage cartridge 32 during the preparation cycle. Such agitation with the serrations 178 may enhance fluidized mixing of the beverage medium 78 with the incoming fluid flow 84, which may provide a more homogeneous wetting and/or heating of the beverage medium 78 and more consistent flavor extraction. The serrations 178 may be any shape known in the art (e.g., rectangular, triangular, hemispherical, blade-shaped, etc.). Moreover, the serrations 178 may extend outwardly from the periphery of the inlet nozzle 44 or may be cut into the periphery thereof. The periphery of the inlet nozzle 44 may also be smooth, or may comprise some smooth portions and some serrations 178 as desired to produce a desired flow of incoming fluid flow 84 with the beverage medium 78 and/or a desired agitation or extraction of flavors from beverage medium 78.

Any combination of the flow ports, channels, and/or serrations shown in FIGS. 7 through 16 is possible with a moving inlet nozzle 44 within the scope of the present disclosure.

Additional and/or Alternate Nozzle Movement

Figure 17:
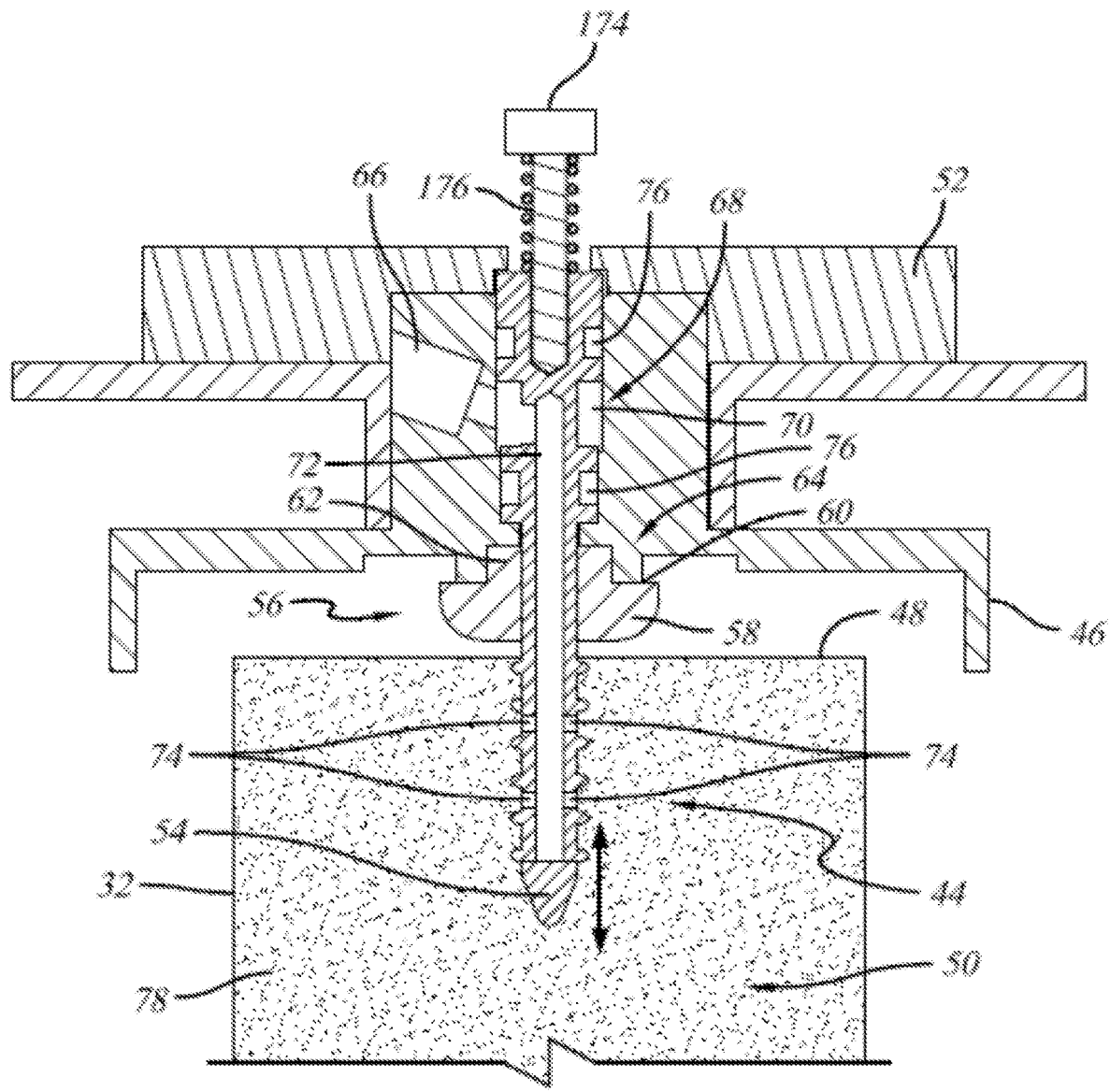
FIG. 17 is a cross-sectional view of a brewer head in accordance with an aspect of the present disclosure.

FIG. 17 illustrates a cross-sectional view of the brewer head in an aspect of the present disclosure.

FIG. 17 illustrates another embodiment where the inlet nozzle 44 vertically oscillates instead of, or in addition to, spinning and/or rotating. The beverage brewer 10 may comprise an inlet nozzle solenoid 174 that causes the inlet nozzle 44 to vertically oscillate as generally illustrated in FIG. 17. The inlet nozzle 44 slidably or otherwise couples to the lid 26 and is generally spring biased in an upper position. The solenoid 174 may extend an oscillation shaft 176 down into contact with the inlet nozzle 44, thereby forcing the inlet nozzle 44 downwardly against the return force of the spring and into an extended position.

The solenoid 174 then retracts the oscillation shaft 176, and the spring-bias returns the inlet nozzle 44 to the upper position. The beverage brewer 10 may pulse the solenoid 174, thereby causing the inlet nozzle 44 to move up and down at a predetermined or desired rate. In one embodiment, the inlet nozzle 44 may move up and down at a rate of 50-70 Hertz, such as a rate of 60 Hertz, as 60 Hertz is the frequency used for power delivery in the United States, thereby simplifying the coupling of the solenoid 174 to a frequency source. The inlet nozzle 44 may vertically oscillate at any rate within the scope of the present disclosure, and the vertical oscillation rate may change during the course of a brew cycle. The beverage brewer 10 may alternately use a cam or other means to vertically oscillate the inlet nozzle 44 in accordance with the embodiments described herein. In another alternative embodiment, the inlet nozzle 44 may also simultaneously vertically oscillate and rotate, as described above, at least in part to assist in the agitation or movement of beverage medium 78. Indeed, many different combinations of inlet nozzle 44 movement as described herein are possible.

Processor Control of Beverage Brewer

Figure 18:
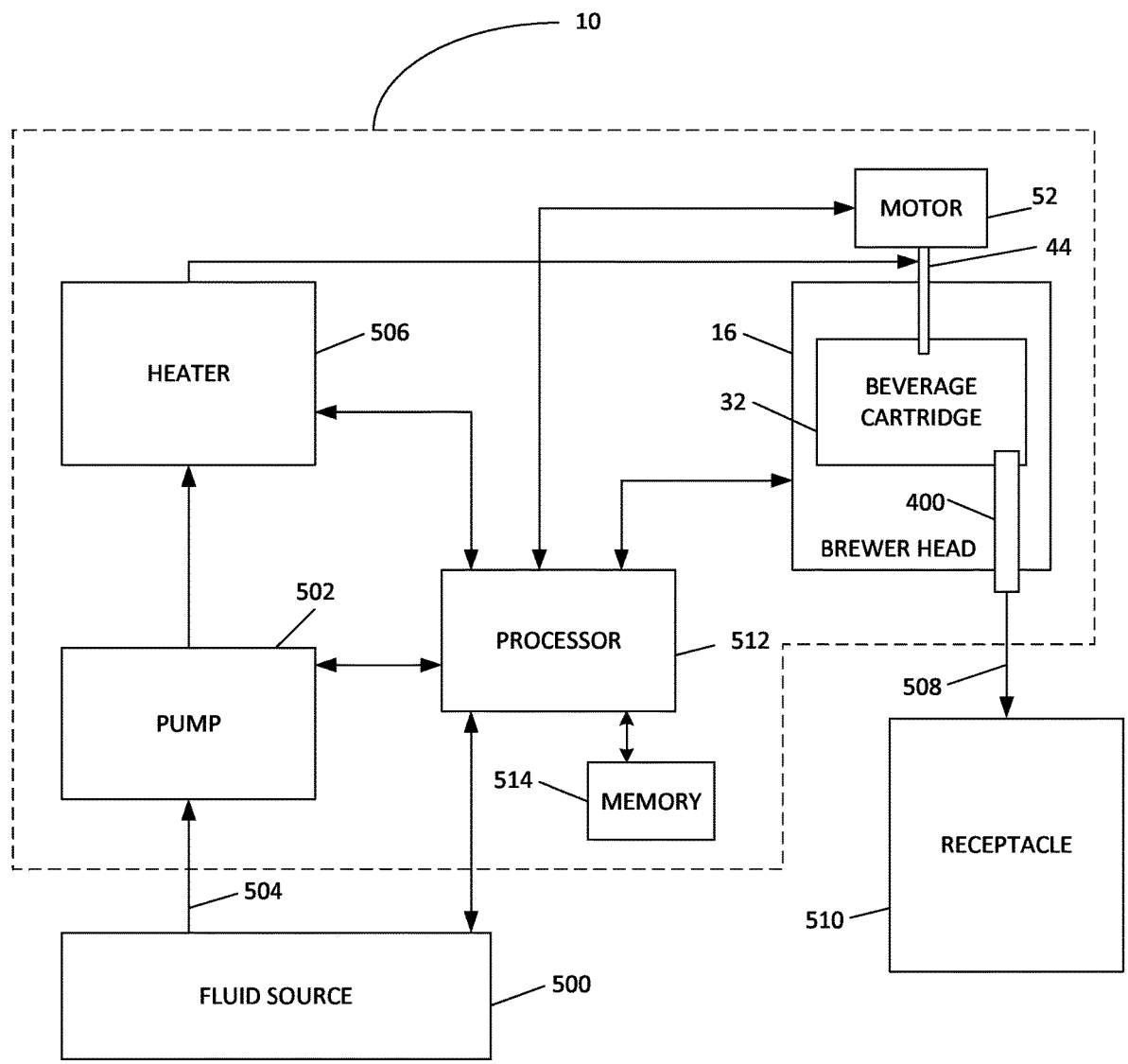
FIG. 18 illustrates a block diagram of a beverage brewer in accordance with an aspect of the present disclosure.

FIG. 18 illustrates a block diagram of a beverage brewer in accordance with an aspect of the present disclosure.

Beverage brewer 10, as shown in dashed lines in FIG. 18, may be coupled to a fluid source 500. The fluid source 500 may be a reservoir that is included within and/or attached to a beverage brewer 10, but such a fluid source may also be the water supply for a home or building, a filtered water supply, a carbon dioxide ($CO_2$) line, or other fluid source as desired. Further, more than one fluid source 500 may be coupled to the beverage brewer 10.

A pump 502 is coupled to the fluid source 500. The pump may provide pressure to the fluid 504 within the beverage brewer 10, such that the pump 500 delivers the fluid 504, e.g., water, milk, $CO_2$, etc., at a desired, known, and/or predetermined pressure to the remainder of the beverage brewer 10.

The pump 502 is coupled to a heater 506, and delivers fluid 504 to heater 506 for those fluids 504 that may need to be heated prior to delivery to the beverage cartridge 32. Heater 506 heats (or optionally cools) the fluid 504 as desired. Heater 506, when employed by the beverage brewer 10, delivers the heated or otherwise processed fluid 504 to the inlet nozzle 44.

When the brewer head 16 is in the proper position (i.e., the closed position shown in FIG. 1), at least a portion of the inlet nozzle 44 is coupled to the inner chamber 50 of the beverage cartridge 44. Fluid 504 that is delivered to the inlet nozzle 44 may then be delivered to the inner chamber of the beverage cartridge 32.

During at least a portion of the time that the brewer head 16 is in the closed position, motor 52 and/or other means within beverage brewer 10, may spin, rotate, nutate, vibrate, oscillate, or otherwise move inlet nozzle 44, such as the movements previously described. Fluid 504 delivered through the moving inlet nozzle 44 may then move the beverage medium 78 (as shown in FIGS. 5 and 16) to assist in the fluidizing and/or mixture of fluid 504 with beverage medium 78.

The outlet conduit 400 is also coupled to the inner chamber 50 of the beverage cartridge 32 when the brewer head is in the closed position. As such, as the fluidization of fluid 504 and beverage medium 78 occurs, a secondary fluid 508 is delivered from the inner chamber 50 of the beverage cartridge 32 to a receptacle 510, e.g., a coffee mug, glass, cup, or other container that may be external to the beverage medium 10. The beverage brewer 10 may also comprise receptacle 510, e.g., a carafe, etc., however, in many applications the receptacle eventually is used externally to the beverage brewer 10.

The pump 502, motor 52, heater 506, brewer head 16, and, optionally, the fluid source 500, are coupled to a processor 512. The processor 512 is further coupled, either internally or externally, to a memory 514. The processor 512 provides computer-based control of the pump 502, motor 52, and heater 506, and may control other components within beverage brewer 10.

For example, and not by way of limitation, the processor 512 may receive a signal or other input from a sensor coupled to the fluid source 500, to indicate to the beverage brewer 10 that there is not enough fluid 504 available to brew a beverage. The processor 512 may then prevent the beverage brewer 10 from initiating a preparation cycle for a beverage cartridge 32.

Further, the processor 512 may sense a particular type of beverage cartridge 32 present in the brewer head 16. Once the type of beverage cartridge 32 is known, the processor 512 may provide different inputs to the pump 502, motor 52, heater 506, or other components in the beverage brewer 10 to change one or more variables in the mixture of fluid 504 and the beverage medium in the particular beverage cartridge 32. The processor 512 may increase or decrease the speed of rotation of motor 52, may insert the inlet nozzle 44 further into the beverage container 32, provide pulsed or different types of current to the pump 502 and/or heater 506, or may change some path for the fluid 504 prior to introduction into the inner chamber 50 of the beverage cartridge 32. Additionally, the processor 512 may select a particular kind of inlet nozzle 44 motion or combination of motions based on the type of beverage cartridge 32 that is sensed or a specific user input. These and/or other inputs to the processor 512 may cause the processor 512 to access memory 514 to provide such instructions to various components of the beverage brewer 10.

Process Flow

Figure 19:
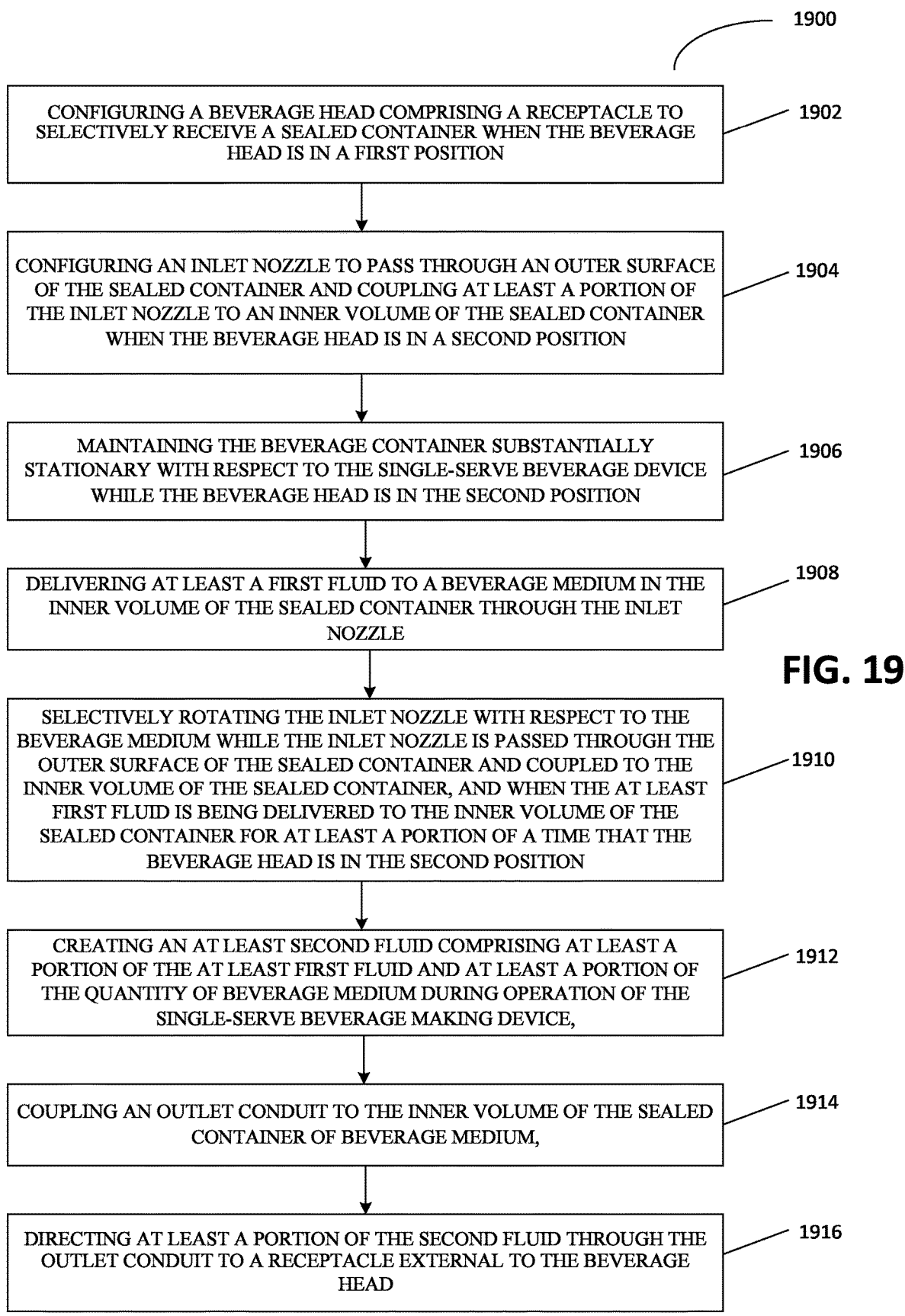
FIG. 19 illustrates a flow diagram showing possible steps used in an embodiment of the present disclosure.

FIG. 19 is a process diagram 1900 illustrating possible steps used in an embodiment of the present disclosure.

Block 1902 illustrates configuring a beverage head comprising a receptacle to selectively receive a sealed container when the beverage head is in a first position (e.g., open). Block 1904 illustrates configuring an inlet nozzle to pass through an outer surface of the sealed container and coupling at least a portion of the inlet nozzle to an inner volume of the sealed container when the beverage head is in a second position (e.g., closed). Block 1906 illustrates maintaining the beverage container substantially stationary with respect to the single-serve beverage device while the beverage head is in the second position. Block 1908 illustrates delivering at least a first fluid to a beverage medium in the inner volume of the sealed container through the inlet nozzle. Block 1910 illustrates selectively rotating the inlet nozzle with respect to the beverage medium while the inlet nozzle is passed through the outer surface of the sealed container and coupled to the inner volume of the sealed container, and when the at least first fluid is being delivered to the inner volume of the sealed container for at least a portion of a time that the beverage head is in the second position. Block 1912 illustrates creating an at least second fluid comprising at least a portion of the at least first fluid and at least a portion of the quantity of beverage medium during operation of the single-serve beverage making device. Block 1914 illustrates coupling an outlet conduit to the inner volume of the sealed container of beverage medium. Block 1916 illustrates directing at least a portion of the second fluid through the outlet conduit to a receptacle external to the beverage head.

Figure 20:
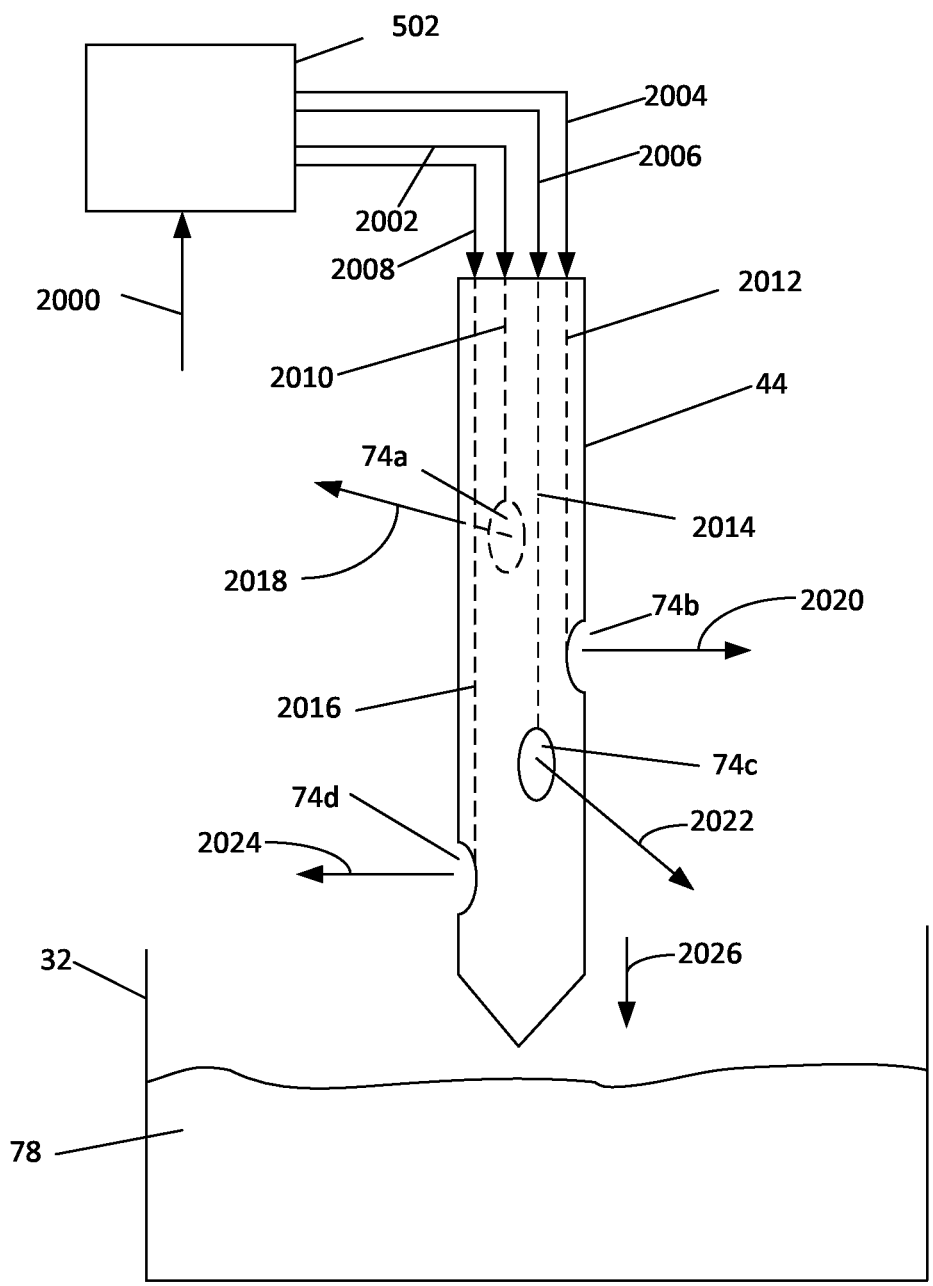
FIG. 20 illustrates an inlet nozzle in accordance with an aspect of the present disclosure.

FIG. 20 illustrates an inlet nozzle in accordance with an aspect of the present disclosure.

In an aspect of the present disclosure, pump 502 may direct fluid 2000, which may be one or more fluids, to one or more conduits 2002-2008 at specified times. As an example, and not by way of limitation, pump 502 may deliver fluid 2000 to conduit 2002 for a first time period, then discontinue delivery of fluid 2000 to conduit 2002 and begin delivering fluid 2000 to conduit 2004 for a second time period. It is also understood that delivery of the fluid 2000 to different conduits may overlap; for example, delivery of the fluid 2000 to conduit 2002 may end after delivery of fluid to another conduit, e.g. the conduit 2004, has begun. By alternating or staggering the flow of fluid 2000 to different conduits 2002-2008 during different time periods, fluid 2000 may be selectively delivered through channels 2010-2016 in inlet nozzle 44 to flow ports 74*a*-74*b*. Flow port 74*a* is shown in phantom lines to indicate that flow port 74*a* is on a surface not visible from the perspective of FIG. 20. Further, flow ports 74*b* and 74*d* are shown as being approximately in the plane of perspective of FIG. 20, and flow port 74*c* is shown as facing the perspective plane of FIG. 20. There may be fewer or additional flow ports 74*a*-*d*, and the flow ports 74*a*-*d* may be at any angle, location, or orientation with respect to each other or with respect to the inlet nozzle 44 without departing from the scope of the present disclosure.

As the fluid 2000 is selectively delivered to one or more of flow ports 74*a*-74*b*, a sequence of fluid flows 2018-2024 may be created. Although a sequence of fluid flows 2018-2024 may be sequential, e.g., first fluid flow 2018, then fluid flow 2020, then fluid flow 2022, then fluid flow 2024 (also referred to as a "chaser" sequence), any sequence of fluid flows 2018-2024 including but not limited to exclusive and/or overlapping fluid flows may be employed within the scope of the present disclosure.

The sequencing of fluid flows 2018-2024 may be obtained by, for example, pump 502 comprising and/or being coupled to a manifold that has a rotating or movable plenum that selectively directs the fluid 2000 to one or more of the conduits 2002-2008. Other means for obtaining selective delivery of fluid 2000 to one or more of the conduits 2002-2008 are possible within the scope of the present disclosure.

With or without rotating or otherwise moving the inlet nozzle 44, the fluid flows 2018-2024, through sequencing, upon introduction or proximity to beverage cartridge 32 and/or beverage medium 78 as shown by arrow 2026, may create a fluid flow, agitation, or other movement of beverage medium 78 with the fluid flows 2018-2024. Further, control of the sequencing of fluid flows 2018-2024 may be performed by processor 412, and the speed, order, and pressure of fluid flows 2018-2024 may be varied or constant during a preparation cycle, or may be combined with rotational, vibrational, and/or other motion of inlet nozzle 44 to create a preferred time, concentration, and/or other mixture or agitation of fluid 2000 with beverage medium 78. The control of the order, speed, and pressure of fluid flows 2018-2024 may also be based on other factors, such as the type of beverage medium 78, the presence or absence of a beverage cartridge 32, the presence or absence of a cover 49 on the beverage cartridge 32, manual inputs or overrides to the beverage brewer 10, or other factors.

The memory 514 may be implemented in firmware and/or software implementation. The firmware and/or software implementation methodologies may be implemented with modules (e.g., procedures, functions, and so on) that perform the functions described herein. A machine-readable medium tangibly embodying instructions may be used in implementing the methodologies described herein. For example, software codes may be stored in a memory (e.g., memory 514) and executed by a processor unit (e.g., processor 512). Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to brewers. Of course, if the brewer is inverted, above becomes below, and vice versa. Additionally, if oriented sideways, above and below may refer to sides of a brewer. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although several embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims.

What is claimed is:

1. A single-serve beverage making device, comprising:
    a beverage head including a receptacle configured to selectively receive a sealed container when the beverage head is in a first position, the sealed container comprising an outer surface and an inner volume, wherein the sealed container is configured to contain a quantity of beverage medium within the inner volume of the sealed container;
    an inlet nozzle coupled to the beverage head, the inlet nozzle configured to pass through the outer surface to couple at least a portion of the inlet nozzle to the inner volume when the beverage head is in a second position, in which at least a first fluid is delivered to the quantity of beverage medium through the inlet nozzle while the beverage head is in the second position, such that an at least second fluid comprising at least a portion of the at least first fluid and at least a portion of the quantity of beverage medium is created, the receptacle configured to maintain the sealed container substantially stationary with respect to the single-serve beverage device while the beverage head is in the second position, wherein the inlet nozzle further comprises an outer shaft coupled to the outer surface of the sealed container and an inner platform wherein the inner platform rotates with respect to the outer shaft;

an outlet conduit, coupled to the beverage head and to the inner volume, in which the outlet conduit is configured to direct at least a portion of the second fluid to a receptacle external to the beverage head, wherein the inlet nozzle is configured to selectively move with respect to the sealed container while the inlet nozzle is passed through the outer surface of the sealed container and coupled to the inner volume for at least a portion of the time the at least first fluid is being delivered to the inner volume of the sealed container; and a controller coupled to the inlet nozzle, in which the controller is configured to selectively move the inlet nozzle while the inlet nozzle is passed through the outer surface of the sealed container and in contact with the inner volume of the sealed container.

2. The single-serve beverage making device of claim 1, in which the controller is configured to selectively vibrate the inlet nozzle while the inlet nozzle is passed through the outer surface of the sealed container and in contact with the inner volume of the sealed container.

3. The single-serve beverage making device of claim 1, in which the controller is configured to selectively rotate the inlet nozzle while the inlet nozzle is passed through the outer surface of the sealed container and in contact with the inner volume of the sealed container.

4. The single-serve beverage making device of claim 3, in which the rotation of the inlet nozzle comprises a rotational motion in more than one direction of rotation.

5. The single-serve beverage making device of claim 1, in which the inlet nozzle further comprises at least one flow port, in which the at least one flow port is configured to assist in the creation of the at least one second fluid.

6. The single-serve beverage making device of claim 1, in which the inlet nozzle further comprises at least one channel, the at least one channel configured to direct the at least first fluid when the inlet nozzle is coupled to the inner chamber.

7. A single-serve beverage making device, comprising:
a beverage head including a receptacle configured to selectively receive a sealed container when the beverage head is in a first position, the sealed container comprising an outer surface and an inner volume, wherein the sealed container is configured to contain a quantity of beverage medium within the inner volume of the sealed container;

an inlet nozzle coupled to the beverage head, the inlet nozzle configured to pass through the outer surface to couple at least a portion of the inlet nozzle to the inner volume when the beverage head is in a second position, in which at least a first fluid is delivered to the quantity of beverage medium through the inlet nozzle while the beverage head is in the second position, such that an at least second fluid comprising at least a portion of the at least first fluid and at least a portion of the quantity of beverage medium is created, the receptacle configured to maintain the sealed container substantially stationary with respect to the single-serve beverage device while the beverage head is in the second position, wherein the inlet nozzle further comprises at least one serration;

an outlet conduit, coupled to the beverage head and to the inner volume, in which the outlet conduit is configured to direct at least a portion of the second fluid to a receptacle external to the beverage head, wherein the inlet nozzle is configured to selectively move with respect to the sealed container while the inlet nozzle is passed through the outer surface of the sealed container and coupled to the inner volume for at least a portion of the time the at least first fluid is being delivered to the inner volume of the sealed container; and a controller coupled to the inlet nozzle, in which the controller is configured to selectively move the inlet nozzle while the inlet nozzle is passed through the outer surface of the sealed container and in contact with the inner volume of the sealed container.

8. The single-serve beverage making device of claim 7, in which the controller is configured to selectively vibrate the inlet nozzle while the inlet nozzle is passed through the outer surface of the sealed container and in contact with the inner volume of the sealed container.

9. The single-serve beverage making device of claim 7, in which the controller is configured to selectively rotate the inlet nozzle while the inlet nozzle is passed through the outer surface of the sealed container and in contact with the inner volume of the sealed container.

10. The single-serve beverage making device of claim 9, in which the rotation of the inlet nozzle comprises a rotational motion in more than one direction of rotation.

11. The single-serve beverage making device of claim 7, in which the inlet nozzle further comprises at least one flow port, in which the at least one flow port is configured to assist in the creation of the at least one second fluid.

12. The single-serve beverage making device of claim 7, in which the inlet nozzle further comprises at least one channel, the at least one channel configured to direct the at least first fluid when the inlet nozzle is coupled to the inner chamber.

13. A single-serve beverage making device, comprising:
a beverage head including a receptacle configured to selectively receive a sealed container when the beverage head is in a first position, the sealed container comprising an outer surface and an inner volume and configured to contain a quantity of beverage medium within the inner volume of the sealed container;

an inlet nozzle coupled to the beverage head and configured to pass through the outer surface to couple at least a portion of the inlet nozzle to the inner volume when the beverage head is in a second position, at least a first fluid being delivered to the quantity of beverage medium through the inlet nozzle while the beverage head is in the second position, such that an at least second fluid comprising at least a portion of the at least first fluid and at least a portion of the quantity of beverage medium is created, the receptacle configured to maintain the sealed container substantially stationary with respect to the single-serve beverage device while the beverage head is in the second position, wherein the inlet nozzle further comprises an outer shaft coupled to the outer surface of the sealed container and an inner platform wherein the inner platform rotates with respect to the outer shaft;

an outlet conduit, coupled to the beverage head and selectively coupled to the inner volume, in which the outlet conduit directs at least a portion of the second fluid to a receptacle external to the beverage head, wherein the inlet nozzle is configured to selectively move with respect to the sealed container for at least a portion of the time the at least first fluid is being delivered to the inner volume of the sealed container; and a controller coupled to the inlet nozzle, in which the controller is configured to selectively move the inlet nozzle while the inlet nozzle is in contact with the inner volume when the at least first fluid is being delivered to the inner volume.

14. The single-serve beverage making device of claim 13, in which the selective motion of the inlet nozzle comprises at least one of a selective rotational motion, a selective vibrational motion, and a selective rotational motion.

15. The single-serve beverage making device of claim 13, in which the selective movement of the inlet nozzle comprises a rotational motion in more than one direction of rotation.

16. The single-serve beverage making device of claim 13, in which the inlet nozzle further comprises at least one flow port, in which the at least one flow port is configured to assist in the creation of the at least one second fluid.

17. The single-serve beverage making device of claim 13, in which the inlet nozzle further comprises at least one channel, the at least one channel configured to direct the at least first fluid when the inlet nozzle is coupled to the inner chamber.

18. A single-serve beverage making device, comprising:
a beverage head including a receptacle configured to selectively receive a sealed container when the beverage head is in a first position, the sealed container comprising an outer surface and an inner volume and configured to contain a quantity of beverage medium within the inner volume of the sealed container;

an inlet nozzle coupled to the beverage head and configured to pass through the outer surface to couple at least a portion of the inlet nozzle to the inner volume when the beverage head is in a second position, at least a first fluid being delivered to the quantity of beverage medium through the inlet nozzle while the beverage head is in the second position, such that an at least second fluid comprising at least a portion of the at least first fluid and at least a portion of the quantity of beverage medium is created, the receptacle configured to maintain the sealed container substantially stationary with respect to the single-serve beverage device while the beverage head is in the second position, wherein the inlet nozzle further comprises at least one serration;

an outlet conduit, coupled to the beverage head and selectively coupled to the inner volume, in which the outlet conduit directs at least a portion of the second fluid to a receptacle external to the beverage head, wherein the inlet nozzle is configured to selectively move with respect to the sealed container for at least a portion of the time the at least first fluid is being delivered to the inner volume of the sealed container; and a controller coupled to the inlet nozzle, in which the controller is configured to selectively move the inlet nozzle while the inlet nozzle is in contact with the inner volume when the at least first fluid is being delivered to the inner volume.

19. The single-serve beverage making device of claim 18, in which the selective motion of the inlet nozzle comprises at least one of a selective rotational motion, a selective vibrational motion, and a selective rotational motion.

20. The single-serve beverage making device of claim 18, in which the selective movement of the inlet nozzle comprises a rotational motion in more than one direction of rotation.

21. The single-serve beverage making device of claim 18, in which the inlet nozzle further comprises at least one flow port, in which the at least one flow port is configured to assist in the creation of the at least one second fluid.

22. The single-serve beverage making device of claim 18, in which the inlet nozzle further comprises at least one channel, the at least one channel configured to direct the at least first fluid when the inlet nozzle is coupled to the inner chamber.

\* \* \* \* \*